US012676091B2

(12) United States Patent
Parrat et al.

(10) Patent No.: US 12,676,091 B2
(45) Date of Patent: Jul. 7, 2026

(54) SYNTHETIC IMAGES WITH ANIMATION OF PERCEIVED DEPTH

(71) Applicant: ROLLING OPTICS INNOVATION AB, Solna (SE)

(72) Inventors: Daniel Parrat, Uppsala (SE); Axel Lundvall, Bjursås (SE); Erik Egemalm, Uppsala (SE)

(73) Assignee: ROLLING OPTICS INNOVATION AB, Solna (SE)

( * ) Notice: Subject to any disclaimer, the term of this patent is extended or adjusted under 35 U.S.C. 154(b) by 320 days.

(21) Appl. No.: 18/285,801

(22) PCT Filed: Apr. 12, 2022

(86) PCT No.: PCT/SE2022/050364
§ 371 (c)(1),
(2) Date: Oct. 5, 2023

(87) PCT Pub. No.: WO2022/220727
PCT Pub. Date: Oct. 20, 2022

(65) Prior Publication Data
US 2024/0371066 A1      Nov. 7, 2024

(30) Foreign Application Priority Data
Apr. 13, 2021    (SE) .................................... 2150453-5

(51) Int. Cl.
*B42D 25/342*        (2014.01)
*G06T 3/40*          (2006.01)
(Continued)

(52) U.S. Cl.
CPC ................ *G06T 13/80* (2013.01); *G06T 3/40* (2013.01); *G06T 5/50* (2013.01); *G06T 7/50* (2017.01);
(Continued)

(58) Field of Classification Search
CPC ............ G02B 30/27; G02B 30/36; G06T 3/40
See application file for complete search history.

(56) References Cited

U.S. PATENT DOCUMENTS

| | | | |
|---|---|---|---|
| 7,738,175 B2 | 6/2010 | Steenblik et al. | |
| 8,739,711 B2 | 6/2014 | Cote | |

(Continued)

FOREIGN PATENT DOCUMENTS

| | | |
|---|---|---|
| CN | 109476173 A | 3/2019 |
| EP | 2 542 423 A1 | 1/2013 |

(Continued)

OTHER PUBLICATIONS

Extended European Search Report for European Application No. 22788542.3, dated Feb. 7, 2025.

(Continued)

*Primary Examiner* — Phong X Nguyen
(74) *Attorney, Agent, or Firm* — Birch, Stewart, Kolasch & Birch, LLP

(57) ABSTRACT

A method for manufacturing a synthetic image device includes providing of a focusing element array. An image layer is arranged in a vicinity of a focal distance of focusing elements, whereby a synthetic image composed of enlarged portions of the image layer becomes perceivable for a viewer. The image layer includes an array of image cells, each associated with a respective focusing element. The step of arranging the image layer includes creation of a respective image object within each respective one of said image cells. The image objects are such that an animation becomes perceivable, comprising a series of synthetic images perceivable in-series as the viewing direction changes. The image objects are such that each one of the synthetic images (Continued)

of the series is perceivable at a respective perceivable depth, changing between the synthetic images of the series of synthetic images.

20 Claims, 31 Drawing Sheets

(51) Int. Cl.

| | | |
|---|---|---|
| *G06T 5/50* | (2006.01) | |
| *G06T 7/50* | (2017.01) | |
| *G06T 11/60* | (2006.01) | |
| *G06T 13/80* | (2011.01) | |

(52) U.S. Cl.

CPC .... *G06T 11/60* (2013.01); *G06T 2207/20221* (2013.01)

(56) References Cited

U.S. PATENT DOCUMENTS

| | | | | |
|---|---|---|---|---|
| 11,590,790 | B2 * | 2/2023 | Rich | B42D 25/425 |
| 2011/0222152 | A1 | 9/2011 | Lundvall | |
| 2012/0274998 | A1 | 11/2012 | Holmes et al. | |
| 2013/0057608 | A1 * | 3/2013 | Yamamoto | G02B 3/06 |
| | | | | 347/102 |
| 2014/0016194 | A1 | 1/2014 | Yao | |
| 2014/0191500 | A1 | 7/2014 | Holmes | |
| 2017/0276458 | A1 | 9/2017 | Scarbrough et al. | |
| 2018/0201044 | A1 * | 7/2018 | Holmes | B42D 25/29 |
| 2018/0215189 | A1 * | 8/2018 | Holmes | B42D 25/324 |
| 2019/0084331 | A1 * | 3/2019 | Kasahara | B41M 5/0088 |
| 2019/0137774 | A1 | 5/2019 | Parrat | |
| 2020/0039279 | A1 * | 2/2020 | Rich | B42D 25/425 |
| 2020/0150586 | A1 * | 5/2020 | Holmes | B42D 25/328 |
| 2022/0258519 | A1 * | 8/2022 | Holmes | B42D 25/324 |
| 2022/0326540 | A1 * | 10/2022 | Jolic | G02B 30/27 |
| 2022/0339958 | A1 * | 10/2022 | Suyal | B42D 25/342 |
| 2024/0371066 | A1 * | 11/2024 | Parrat | G06T 13/80 |

FOREIGN PATENT DOCUMENTS

| | | | |
|---|---|---|---|
| EP | 2 542 423 B1 | | 10/2015 |
| WO | WO 94/27254 A1 | | 11/1994 |
| WO | WO 2008/008635 A2 | | 1/2008 |
| WO | WO 2011/051670 A3 | | 5/2011 |
| WO | WO 2011/107782 A1 | | 9/2011 |
| WO | WO 2012/153106 A1 | | 11/2012 |
| WO | WO 2015/011493 A1 | | 1/2015 |
| WO | WO 2015/011494 A1 | | 1/2015 |
| WO | WO 2018/011546 A1 | | 1/2018 |
| WO | WO 2018/032048 | * | 2/2018 |
| WO | WO 2018/101881 | * | 6/2018 |
| WO | WO 2018/101881 A1 | | 6/2018 |

OTHER PUBLICATIONS

International Search Report, issued in PCT/SE2022/050364, dated May 25, 2022.

Swedish Search Report, issued in Priority Application No. 2150453-5, dated Dec. 27, 2021.

Written Opinion of the International Searching Authority, issued in PCT/SE2022/050364, dated May 25, 2022.

Hutley et al., "The moiré magnifier," Pure Appl. Opt. 3, 1994, pp. 133-142.

* cited by examiner

PART OF IMAGE LAYER

PART OF IMAGE LAYER

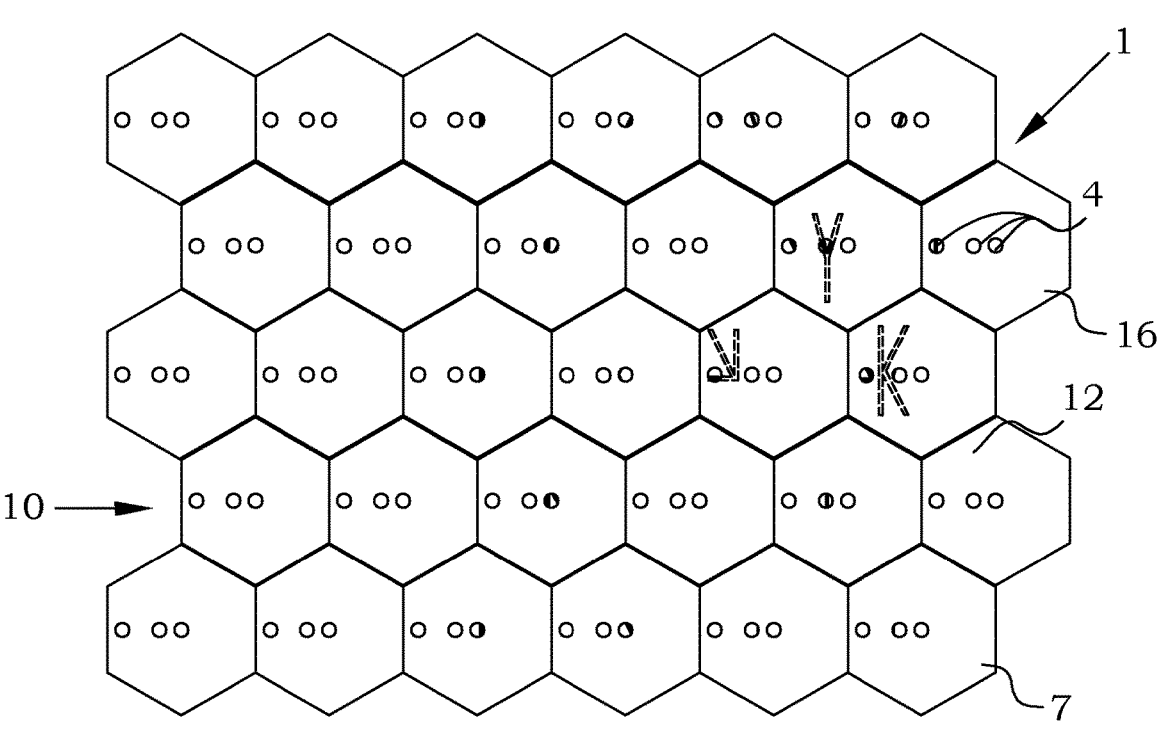
Fig. 7D
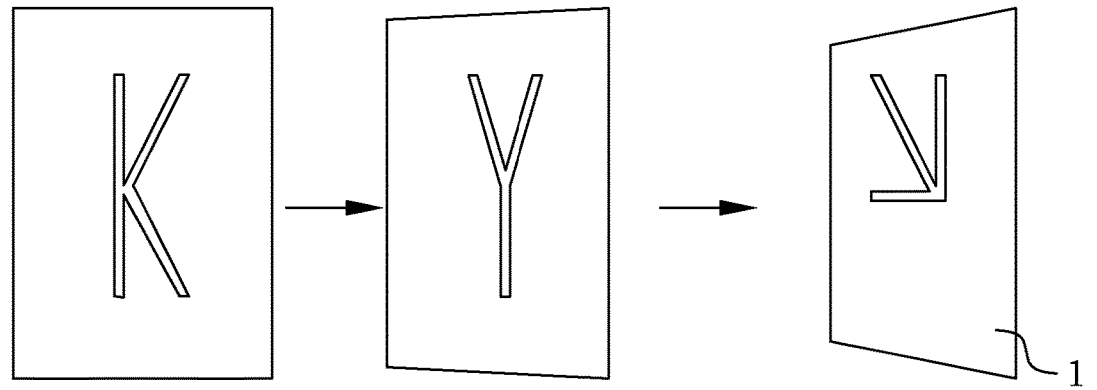

107

116

117

128

118

101

DIGITAL IMAGE MODEL

CLOSE-UP OF DIGITAL IMAGE MODEL

SYNTHETIC IMAGES WITH ANIMATION OF PERCEIVED DEPTH

TECHNICAL FIELD

The present invention relates in general to optical devices and manufacturing processes therefore, and in particular to synthetic-image devices and manufacturing methods therefore.

BACKGROUND

Synthetic-image devices are today often used for creating eye-catching visual effects for many different purposes. Examples of use are e.g. as security documents, security markings, tamper indications or simply as aesthetic images. Usually, the synthetic-image device is intended to be provided as a label or as an integrated part in another device. Many different optical effects have been discovered and used and often different optical effects are combined to give a certain requested visual appearance.

A typical synthetic-image device presents an array of small focusing elements and image objects created in different planes of a thin foil. The focusing element may be different kinds of lenses, apertures or reflectors. An image layer is provided with image objects. The image layer is provided relative to the array of focusing elements such that when the device is viewed from different angles, different parts of the image objects are enlarged by the focusing elements and together form an integral image. Depending on the design of the image objects, the synthetic image can change in different ways when the viewing conditions, e.g. viewing angles, are changed. A typical realization of the synthetic-image device is a thin polymer foil.

The actual perception of the synthetic image is performed by the user's eyes and brain. The ability of the human brain to create an understandable totality from fragmented part images can be used for creating "surprising effect". Such eye-catching effects are popular to be utilized for security and/or authentication purposes.

One often used simple type of "surprising effect" is the provision of a depth perception. Since a synthetic-image device typically is a thin flat device, a synthetic image that behaves as if it was positioned above or below the surface of the synthetic-image device, causes a "strange" experience. The synthetic image appears to float above the surface or appears to be present below the surface. Such an effect is supported by providing a synthetic image that changes according to parallax properties of an image being present above or below the surface. This effect becomes particularly spectacular if the image is a true 3D image, i.e. when the showed object itself has an extension in the depth direction.

Another, often used, surprising effect is to change from one synthetic image to another synthetic image upon tilting the synthetic-image device, i.e. by changing the viewing direction. Such abrupt change of the synthetic image does not follow what is experienced if a real object would have been viewed, and a surprising effect is thus present. This is e.g. illustrated in the published international patent application WO 94/27254 A1, where FIGS. 2A and 2B shows the provision of different images in different directions.

Even more eye-catching effects may be a gradual change of a synthetic image. This can typically be realized by providing a series of "abrupt" changes, but where the differences between each different synthetic image is relatively small. This gives rise to a stepwise animation using synthetic images. Different approaches have been presented.

In the published U.S. Pat. No. 8,739,711 B2, a micro-optic security device is presented, employing planar arrangements of stitched icons and projecting a synthetically magnified image. The synthetically magnified images constitute images that optionally changes to a different image as the security device is tilted, giving different viewing angles. An image layer comprises slices from one or more icon designs, where each slice is spaced apart from, abuts, or slightly overlaps an adjacent slice.

Each slice thus represents a different image. By providing icon designs of successively changing images, and upon tilting, a series of step-wise changing images may be provided. The "smoothness" of such a step-wise change of images depends mainly on the number of successively changing images, which is dependent on the size of the used slices of icon designs. More slices with less changes in the associated images will increase the smoothness. Eventually, the available geometrical resolution of the provided icons puts a limit to this smoothening.

Also, in the published International patent application WO 2018/101881 A1, synthetic-image devices with morphing or animating properties are disclosed, e.g. in connection with FIGS. 27A-D, 28 and 29A-B and pages 40-43. In some embodiments, image cells of the synthetic-image device are divided into channels, which comprises image objects used for creating respective synthetic images. By providing synthetic images in these channels gradually changing their appearance, a step-wise morphing or animation is obtained. Also here, the size of the channels and the differences between neighbouring synthetic images decides the smoothness. Due to physical limitations, the channels and the geometrical structures within the channels cannot be produced properly.

When using an animation to check authenticity of a security document, the security document is studied from a range of viewing directions and any animation or other optical behaviour is compared to a reference behaviour. The reference behaviour defines how the animation or other optical behaviour should perform in order to prove the authenticity of the security document. Reference behaviours may be hard to remember and difficult to compare to if they are too complex. Hence, there is a need of a new type of animation being easy to comprehend and compare to an expected animation behaviour.

SUMMARY

A general object is thus to provide synthetic image device providing an animation being easy to comprehend and compare to an expected animation behaviour.

The above object is achieved by methods and devices according to the independent claims. Preferred embodiments are defined in dependent claims.

In general words, in a first aspect, a method for manufacturing a synthetic image device is provided. The method comprises the steps of providing a focusing element array and arranging an image layer in a vicinity of a focal distance of focusing elements of said focusing element array, whereby a synthetic image composed of enlarged portions of said image layer becomes perceivable for a viewer. The image layer comprises an array of image cells, wherein each image cell is associated with a respective focusing element of said focusing element array and wherein said array of image cells having a same element distance as said focusing element array. The step of arranging the image layer comprises creation of a respective image object within each respective one of said image cells. The image objects are such that an animation becomes perceivable, said animation comprising a series of synthetic images perceivable in-series as the viewing direction changes from a first viewing direction to a second viewing direction. Further, the image objects are such that each one of the synthetic images of said series is perceivable at a respective (stereoscopic) depth changing between the synthetic images of said series of synthetic images. The change of depth throughout the animation utilizes at least three different depths.

Such a method provides a way of manufacturing a synthetic image device which enables a viewing-angle dependent animation of perceived stereoscopic depth. The viewing-angle dependent animation of perceived stereoscopic depth is a clear and unambiguous effect, thus suitable for security documents.

In a second aspect, a synthetic image device comprises a focusing element array and an image layer. The image layer is arranged in a vicinity of a focal distance of focusing elements of the focusing element array, whereby a synthetic image composed of enlarged portions of the image layer becomes perceivable for a viewer. The image layer comprises an array of image cells, wherein each image cell is associated with a respective focusing element of the focusing element array and wherein the array of image cells has a same element distance as the focusing element array. Each image cell comprises an image object and the image objects are such that an animation becomes perceivable, said animation comprising a series of synthetic images perceivable in-series as the viewing direction changes from a first viewing direction to a second viewing direction. Also, the image objects are such that each one of the synthetic images of said series is perceivable at a respective (stereoscopic) depth changing between the synthetic images of said series of synthetic images. The change of depth throughout the animation utilizes at least three different depths.

One advantage with the proposed technology is that a synthetic image animation with viewing angle dependent depth is provided, which is a type of animation easy for the viewer to comprehend and compare to a corresponding reference behaviour of the animation. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 7A-D illustrate schematically the creation of an animated synthetic image.

DETAILED DESCRIPTION

Throughout the drawings, the same reference numbers are used for similar or corresponding elements.

For a better understanding of the proposed technology, it may be useful to begin with a brief overview of synthetic-image devices. This initial overview is provided for the purpose of understanding the basic properties of synthetic images. However, the simplest types of synthetic images mentioned here, e.g. pure moiré images, cannot be used for the purpose of the present invention.

Figures 1A, 1B, 1C:
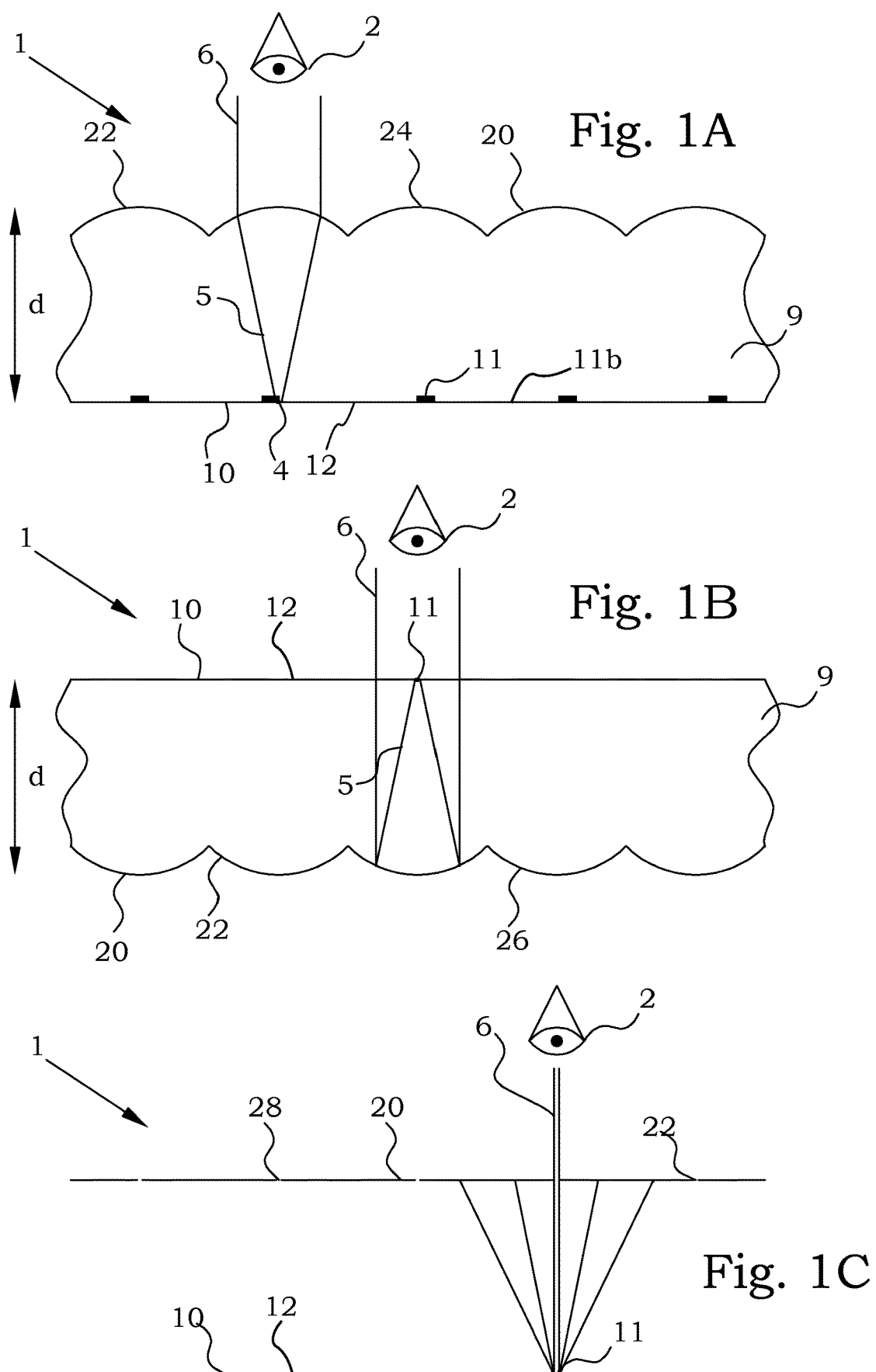
FIGS. 1A-C are schematic drawings of synthetic-image devices utilizing different focusing elements.

FIG. 1A schematically illustrates one example of a synthetic-image device 1. The synthetic-image device 1 comprises a focusing element array 20 of focusing elements 22. In this example, the focusing element is a lens 24. In a typical case, where the synthetic image is intended to be essentially the same in different surface directions, the lens 24 is typically a spherical lens. In applications, where a difference between image properties in different surface directions, lenticular lenses may be used. Also other types of lenses, such as polygonal lenses, zone plate lenses etc. may advantageously be utilized, depending on the application.

The synthetic-image device 1 further comprises an image layer 10 comprising image objects 12. The image objects 12 define the contents of the image layer 10. Image objects 12 may have any contents, such as being at least partly empty and/or as being at least partly constituted by items being optically distinguishable from its surroundings. The image objects 12 may e.g. comprise features 11, e.g. printed product micro features and/or embossed microstructures and portions 11B without any particular features. The image layer 10 is arranged in a vicinity of a focal distance d of the focusing elements 22 of the focusing element array 20. This means that a parallel beam 6 of light impinging on a focusing element 22 will be refracted 5 and focused at one small area, here also denoted as an image point 4, at the image layer 10. Likewise, light emanating from one image point 4 at the image layer 10 will give rise to a parallel beam 6 of light when passing the focusing elements 22. An image point 4 at an image object 12 will therefore appear to fill the entire surface of the focusing element 22 when viewed from a distance in the direction of the produced parallel beam 6 by a viewer, schematically illustrated by the eye of the viewer 2. The material 9 between the image layer 10 and focusing element array 20 is at least partly transparent and is typically constituted by a thin polymer foil.

The distance d does not have to be exactly equal to the focusing distance of the focusing elements 22. First, there is always a certain degree of aberrations, which anyway broadens the area from which the optical information in a parallel beam 6 is collected. This appears more at shallower angles and in order to have a more even general resolution level, a distance in a vicinity, but not exactly equal to the focal distance may be beneficially selected. Furthermore, since the focusing element surface has a certain two-dimensional extension, also this surface could be used to produce fine objects of the total synthetic image. In such cases, fine objects of a small area on the image layer 10 may be beneficial to enlarge to cover the surface of the focusing element, which means that also in such a case, the actual selected distance d is selected to be in a vicinity, but not exactly equal to the focal distance. Such circumstances are well known in the art of synthetic images.

By arranging/designing the image objects 12 of the image layer 10 in a suitable manner, the part images produced at each individual focusing element 22 surface, corresponding to a respective image point 4 being a part of the respective image objects 12 at the image layer 10, will collectively be perceived by a viewer 2 as a synthetic image. Different images may be displayed for the viewer when the synthetic-image device 1 is viewed in different directions, which opens up for creating different kinds of optical effects, as will be described further below.

FIG. 1B schematically illustrates another example of a synthetic-image device 1. In this embodiment, the focusing elements 22 are constituted by concave mirrors 26. The image layer 10 is here situated on the front surface with reference to the viewer 2 and the focusing element array 20 is situated behind the image layer 10. The rays 5 of light travelling from the image objects to the viewer 2 pass the material 9 of the synthetic-image device twice.

FIG. 1C schematically illustrates yet another example of a synthetic-image device 1. In this embodiment, the focusing elements are pinholes 28, restricting the light coming from the image layer 10 and passing through to the viewer 2. In this embodiment, the synthetic image is built by the narrow light beams passing the pinholes 28, and are typically only providing "light" or "dark". Since the pinholes 28 doesn't have any enlarging effect, most of the viewed surface does not contribute to the synthetic image.

Figure 2:
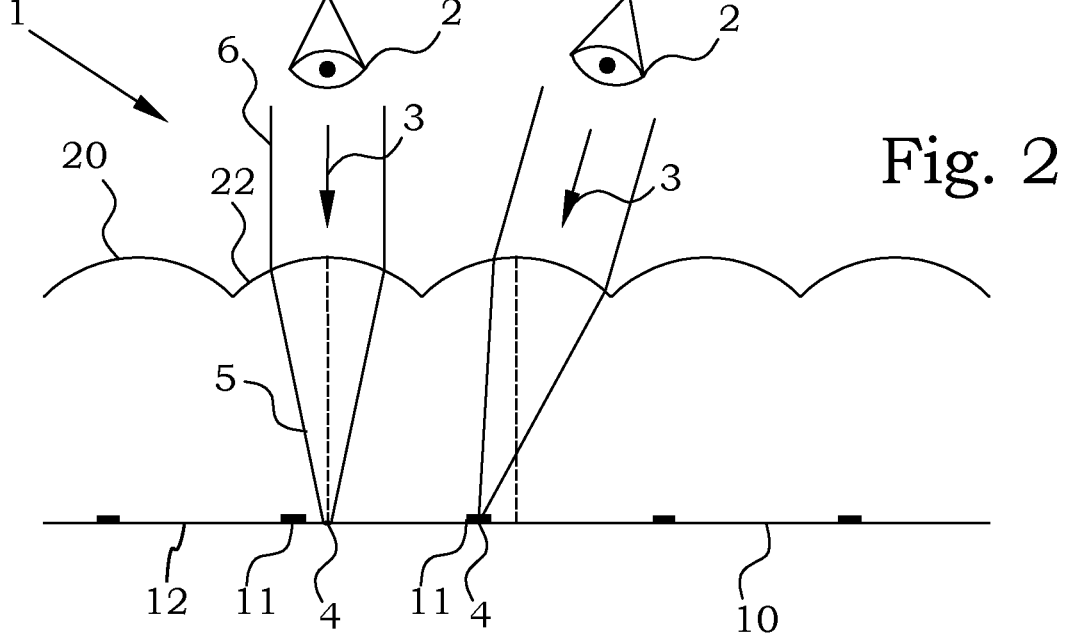
FIG. 2 is a schematic drawing illustrating viewing from different angles.

FIG. 2 illustrates schematically the selection of different part areas or image points 4 of the image layer 10. The image layer 10 comprises features 11 of the image objects 12. When the synthetic-image device 1 is viewed in a viewing direction 3, which as illustrated in the left part of the drawings is perpendicular with reference to the main surface of the synthetic-image device 1, the image point 4 that is enlarged by the focusing element 22 is situated at the centre line, illustrated in the figure by a dotted line, of the focusing element 22. An enlarged version of any contents of the image object 12 at that position, e.g. a feature 11 or a portion 11B without any particular features, is presented at the surface of the synthetic-image device 1. However, as in the case of FIG. 2, no feature 11 is present, and there will be an enlarged image only of the portion 11B without any particular features at the surface of the synthetic-image device 1.

When viewing the synthetic-image device 1 at another angle, as e.g. illustrated in the right part of the figure, the image point 4 on which the focusing element 22 focuses is shifted at the side. In the illustrated situation, the image point 4 overlaps with at least a part of a feature 11 and an enlarged version can be seen at the surface of the synthetic-image device 1. In this way, the images presented at the surface of the synthetic-image device 1 may change for different viewing angles, which can be used for achieving different kinds of optical effects of the synthetic images. There is thus an association between the position of the image point 4 and a viewing direction 3 in which the image point 4 contributes to the synthetic image.

Figure 3A:
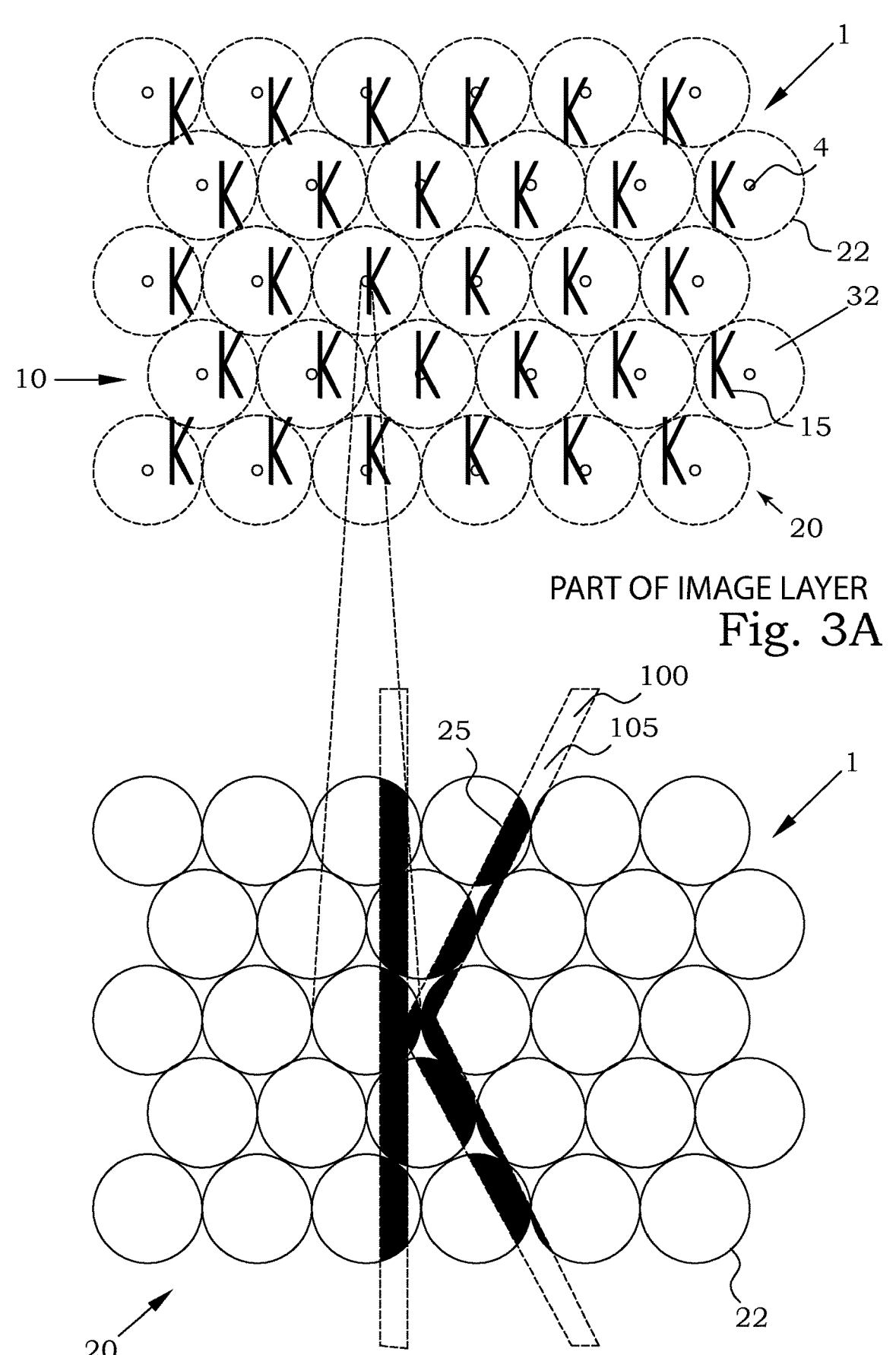
FIGS. 3A-B illustrate the formation of a synthetic image for two different viewing angles.

One type of synthetic image is a so-called moiré image. The moiré magnification effect is well known since many years and is based on the cooperation of two slightly mismatching arrays. These fundamental findings are disclosed e.g. in "The moiré magnifier" by M C Hutley et al, in Pure Appl. Opt. 3 (1994), pp. 133-142. FIG. 3A schematically illustrates in the upper part an example of a part of an image layer 10. The image layer 10 comprises a repetitive pattern of an icon image 15. In this example, the icon image 15 is selected to be the letter "K". Focusing elements 22 associated with the illustrated part of the image layer 10 are illustrated by dotted circles, to indicate the relative lateral position. Both the repetitive pattern of the icon image 15 and the focusing element array 20 have a hexagonal symmetry. However, the distance between two neighbouring icon images 15 is slightly shorter than the distance between two neighbouring focusing elements 22 in the same direction.

An image point 4 is also marked, which corresponds to the focusing area of each focusing element 22, when viewed in the associated viewing direction. In the illustrated case, the image point 4 corresponds to a view direction straight from the front. The parts of the image objects 12 that are present within each of the image points 4 will thereby be presented in an enlarged version over the surface of the corresponding focusing element 22, here denoted as a projected image 25. In the lower part of FIG. 3A, the corresponding focusing element array 20 is illustrated including the projected images 25 of the portion of the icon images 15 falling within the image points 4. The dotted lines from one of the image points 4 in the upper part to one of the focusing elements 22 in the lower part illustrates this association. The different projected images at the focusing elements 22 together forms a synthetic image 100. In this case, the synthetic image 100 is a part of a large "K". If these structures are small enough, the human eye will typically fill in the empty areas between the focusing elements 22 and the viewer will perceive a full "K". The reason for the K to be produced is the existence of the slight period mismatch between the repetitive pattern of icon images 15 and the focusing element array 20. In this example, using the mismatch between a repetitive pattern of icon images 15 and an array of focusing elements 22, the synthetic image 100 is called a moiré image 105.

Figure 3B:
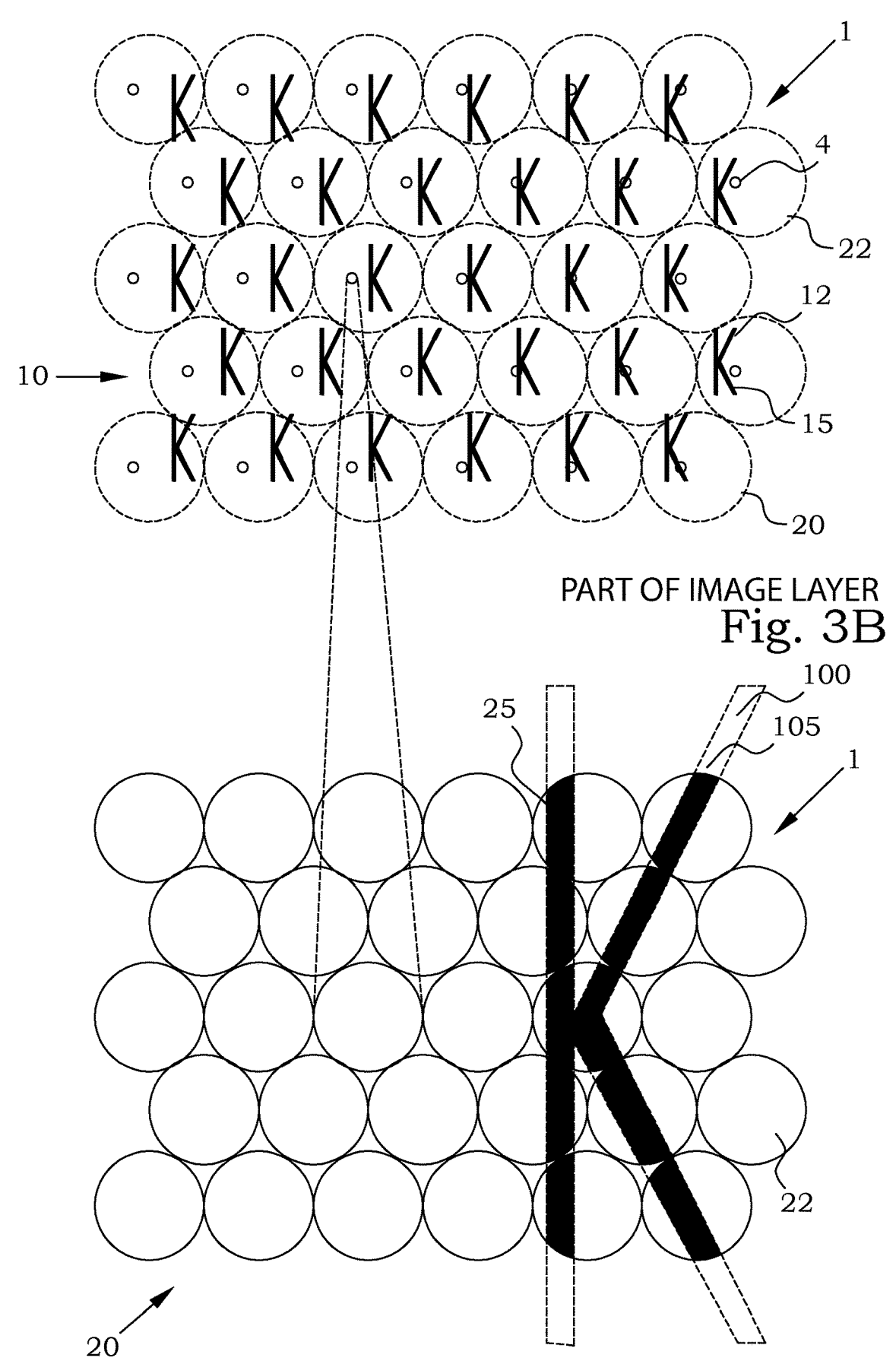

FIG. 3B schematically illustrates the same synthetic-image device 1 as in FIG. 3A, but when viewed in another viewing direction. This corresponds to a slight tilting of the synthetic-image device 1 to the left. The image points 4 which corresponds to the focusing areas of the focusing elements 22 in this direction are thereby moved somewhat to the left. This results in that another set of image points 4 are projected to the focusing elements 22, as seen in the lower part of the FIG. 3B. The result of the tilting is that the synthetic image 100, i.e. the large "K" moves to the right.

The viewer will interpret such a motion as a result of a position of the large "K" at a certain imaginary or apparent depth below the surface of the synthetic-image device 1. In other words, a depth feeling is achieved. Both the magnification and the experienced depth depends on the relation between the focusing element array 20 and the repetitive pattern of icon images 15. It has in prior art been shown that the obtained magnification M is determined as:

$$M = \frac{1}{F - F^2}, \qquad (1)$$

$$\text{where } F = \frac{P_o}{P_l},$$

where $P_o$ is the period of the repetitive pattern of icon images 15 and $P_l$ is the period of the focusing element array 20. For $P_o < P_l$, the magnification is positive, for $P_o > P_l$, the magnification becomes negative, i.e. the synthetic image 100 becomes inverted compared to the image objects 12.

The apparent image depth $d_i$ of the moiré image when using spherical microlenses can also be determined as:

$$d_i = (d - R_l)/(1 - F) + R_l, \qquad (2)$$

where d is the thickness of the synthetic-image device and $R_l$ is the radius of the curvature of the spherical microlenses. One can here notice that for $P_o < P_l$, the apparent depth is typically positive, while for $P_o > P_l$, the apparent depth becomes negative, i.e. the moiré image 105 seems to float above the surface of the synthetic-image device 1.

One may also notice that for depths that are much larger than the microlens radius, the apparent image depth is approximately proportional to the magnification. This is the case in essentially all practical cases, since a microlens radius typically is in the order of magnitude of 10-200 μm, whereas the apparent depth typically is at least several mm. In general, for a lens array, the following relation is valid:

$$d_i = M(d - R_l) + R_l, \qquad (3)$$

It should be noted that the differences in periods illustrated in FIGS. 3A and 3B are relatively large, which gives a relatively low magnification and a relatively small apparent depth. This is made for purposes of illustration. In typical moiré synthetic-image devices, the relative period differences may typically be much less. Period differences of less than 1% and even less than 0.1% are not uncommon.

Figures 4A, 4B, 4C:
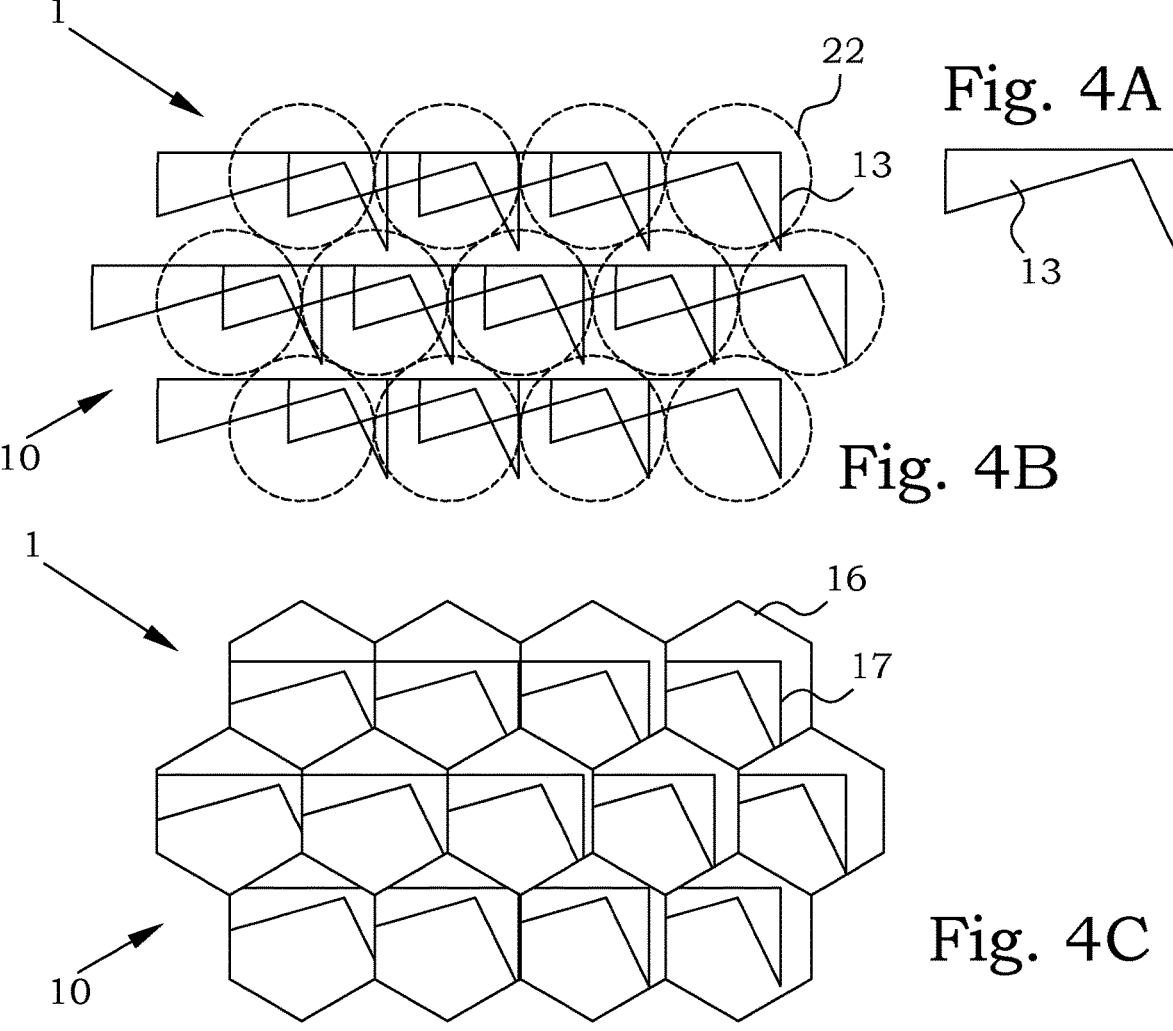
FIGS. 4A-C illustrate the ideas of forming an example of an integral synthetic-image device.

The concept of moiré images can be further generalized. In FIG. 4A, an icon image 15 to be magnified by moiré magnification is schematically illustrated.

If this icon image 15 is repeated in a pattern with almost the same period as for the focusing elements 22 of FIG. 4B, the icon 15 will overlap. The moiré image from such a structure will be almost impossible for the human brain to resolve, since parts of the icon images 15 associated with a neighbouring focusing element 22 will interfere.

A solution is presented in FIG. 4C, where the image layer 10 is spatially divided into portions called image cells 16. One image cell 16 is exclusively associated with each focusing element 22, i.e. the image cells 16 define non-overlapping portions of the image layer 10. The image layer 10 thus comprises an array of image cells 16, wherein each image cell 16 is associated with a respective focusing element of the focusing element array. The contents of the image layer 10 within the bounds of each image cell 16 is here referred to as the 'image object' 12 of that image cell 16.

Within each image cell 16, only parts of the original repeated icon image 15 belonging to one copy of the repeated icon image 15 is preserved as a so called truncated icon image 17 for that image cell 16 and the other interfering repeated icon images 15 are removed from the image object 12 of that image cell 16. The truncation of an icon image 15 means that only portions of the image icon 15 being within the bounds of an image cell 16 are preserved in the truncated icon image 17. The different truncation of the icon images 15 of the different image cells 16 result in that the contents of each nearby image cell 16 changing across the image layer 10 rather than repeating. By using these cut-out parts or fractions as the truncated icon image 17, a synthetic image will also be produced. A synthetic image based on possibly non-identical, truncated icon images 17 within image cells 16 associated with the focusing elements 22 is in this disclosure referred to as an integral synthetic image.

Figure 5:
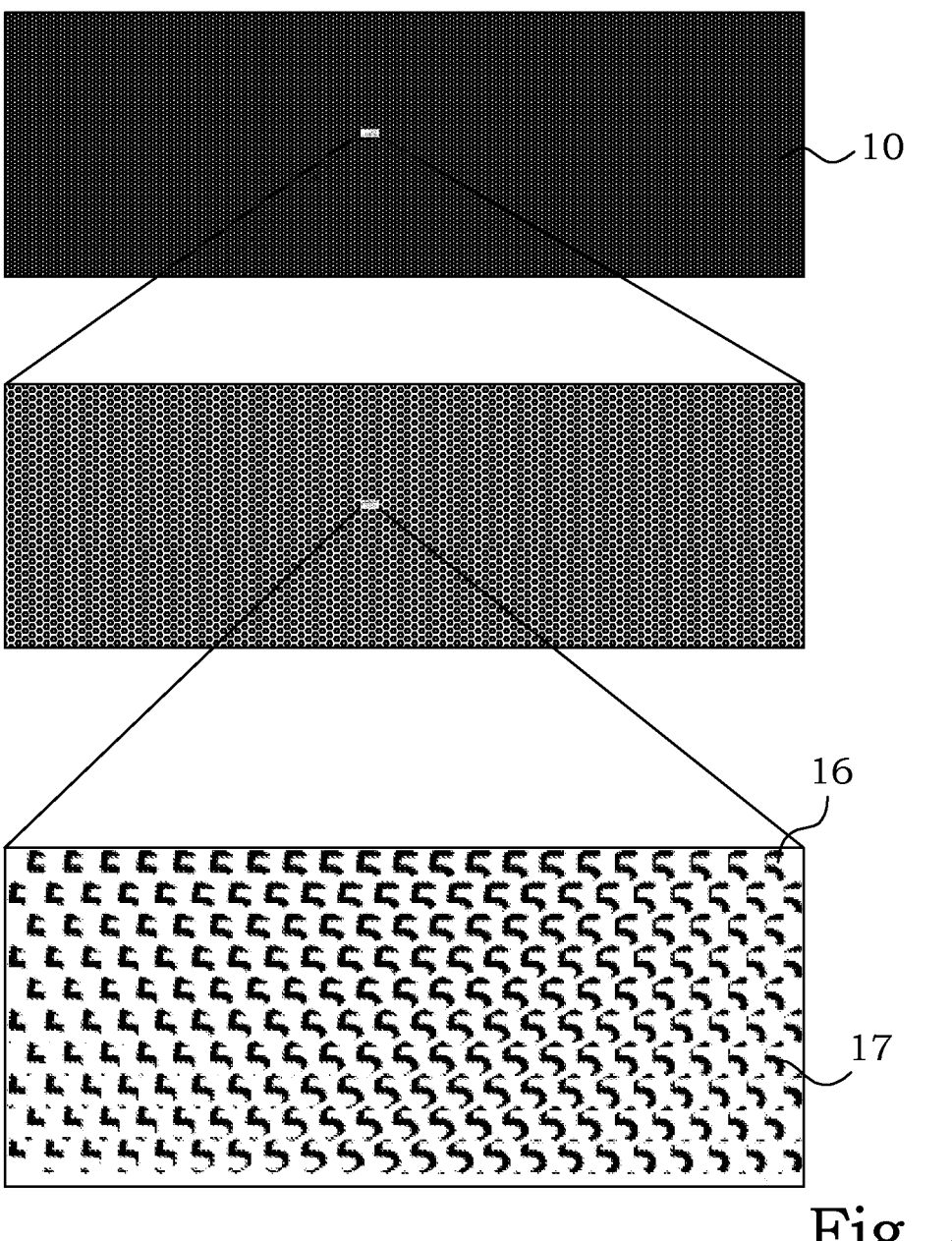
FIG. 5 illustrate another example of an integral synthetic-image device.

An example of a part of an image layer 10 of an integral synthetic-image device giving rise to an image of the figure "5" is illustrated in FIG. 5.

As long as the focusing area of the associated focusing element, i.e. the image point, is kept within the image cell 16 a synthetic image similar to a moiré image will be produced. However, when the viewing angle changes enough to make the focusing area of the associated focusing element to enter into a neighbouring image cell 16, the synthetic image will suddenly disappear and will instead appear at another position; a flip in the synthetic image occurs.

The ideas of having image cells with different image objects can be driven further. A moiré synthetic image can be given an apparent depth, but is in principle restricted to one depth only. A true three-dimensional appearance is difficult to achieve with moiré synthetic images. However, when considering integral synthetic images, there is a freedom of changing the icon images from one image cell to another. This freedom can also be used e.g. to provide a more realistic three-dimensionality of the produced synthetic images.

Figure 6:
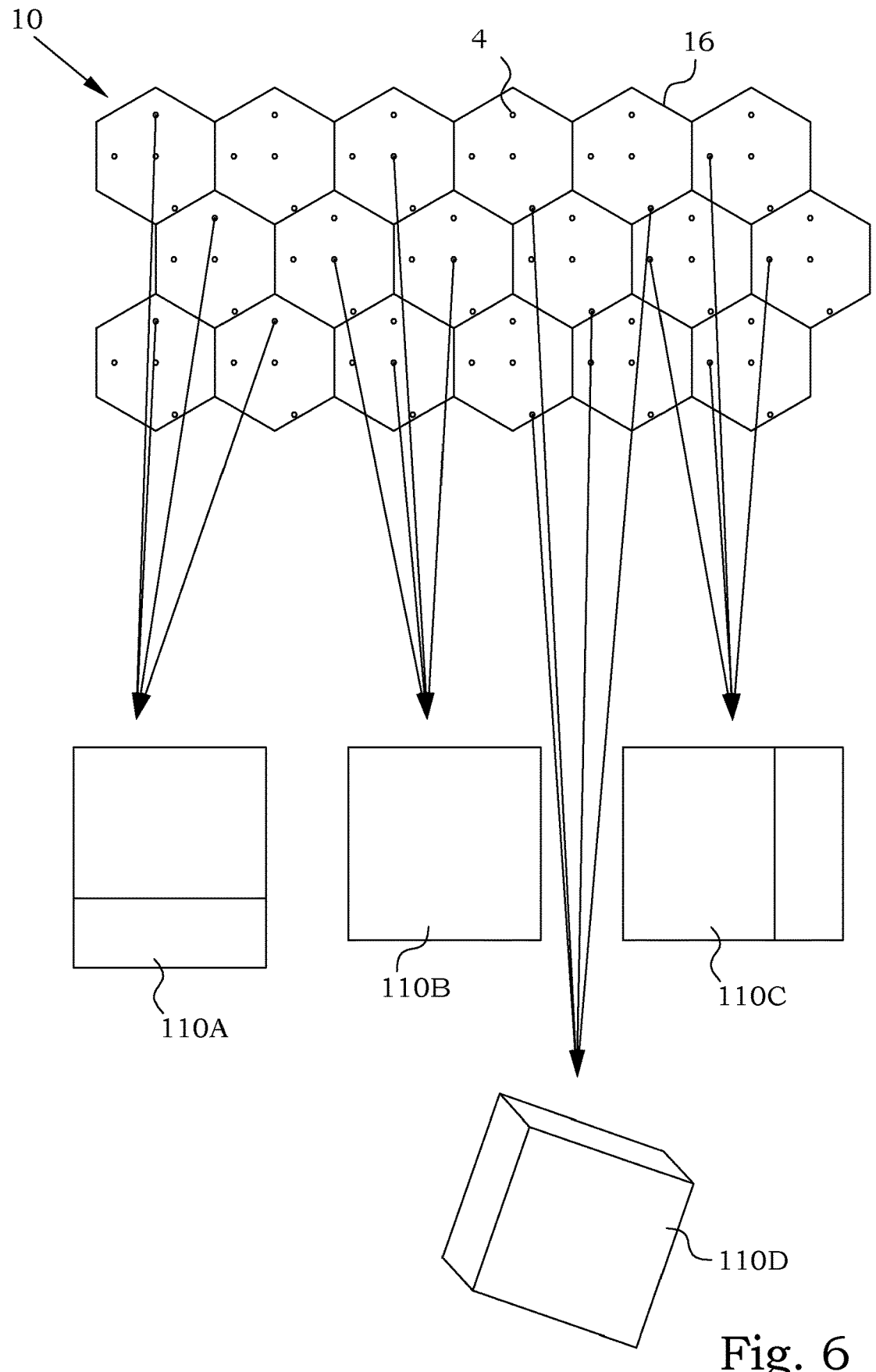
FIG. 6 illustrates an example of how a three-dimensional image can be created.

In FIG. 6, image cells 16 of an image layer 10 are illustrated. Four different image points 4 for each image cell 16, corresponding to focusing areas of associated focusing elements when viewed in four different directions are illustrated. Parts of an image object within the centre image point 4 in each image cell corresponds to a viewing angle as achieved if the synthetic-image device is viewed in a perpendicular manner. Such image object parts may then be designed such that they give rise to an integral synthetic image 110B as illustrated in the lower centre part of FIG. 6 showing a top surface of a box. Image object parts of the uppermost image point 4 in each image cell 16 corresponds to a viewing angle as achieved if the synthetic-image device is tilted away from the viewer. Such parts of the image objects may then be designed such that they give rise to an integral synthetic image 110A as illustrated in the lower left part of FIG. 6, showing the top surface and a front surface of a box. Parts of the image objects of the leftmost image point 4 in each image cell 16 corresponds to a viewing angle as achieved if the synthetic-image device is tilted to the left with reference to the viewer. Such image object parts may then be designed such that they give rise to an integral synthetic image 110C as illustrated in the lower right part of FIG. 6, showing the top surface and a side surface of a box. Parts of the image objects of the image point 4 in the lower right part in each image cell corresponds to a viewing angle as achieved if the synthetic-image device is tilted towards and to the right with reference to the viewer. Such image object parts may then be designed such that they give rise to an integral synthetic image 110D as illustrated at the very bottom of FIG. 6, showing the top surface, a side surface and a back surface of a box. Together, these integral synthetic images 110A-D and further integral synthetic images emanating from other image points of the image cells 16 give an impression of a rotating box in a three-dimensional fashion. This change of the synthetic image thus follows expected parallax rules. The so achieved image properties are in such cases simulations of "real" optical properties, e.g. a true three-dimensional image with parallax changes.

In a similar fashion, by modifying the image content, i.e. the image object, in each image cell separately, different kinds of optical phenomena can be achieved. By adapting the image object of each part of the image cell according to the requested image appearance in a corresponding viewing direction, the integral synthetic image can be caused to have almost any appearances. The so achieved image properties can therefore be designed to show optical effects which are not present in "real" systems, i.e. having non-parallax features. One such image property that can be varied for different viewing directions is the perceived depth of the synthetic image and this is the type of change that is the object of the present technology.

A simple effect is to switch between different synthetic images for different angle sectors. This was illustrated e.g. in the published international patent application WO 94/27254 A1. In such cases, expressed in terms of an integral image, the image layer is provided with more than one image cell associated with a single focusing element. Within each of these image cells, image objects are provided, which gives rise to a particular synthetic image. Since the area of each image cell is limited, the angular directions within which the synthetic image is visible are also limited. Another typical example of such an arrangement can be found in FIG. 47 of the U.S. Pat. No. 7,738,175 B2. Here, a number of image cells are provided, divided in an azimuthal direction into sectors. This means that the different synthetic images are viewable in restricted azimuthal viewing directions.

In the present disclosure, a slightly different vocabulary is applied. One common image cell is associated with each focusing element. The image object is considered to be associated with features of this common image cell. This common image cell can then be divided in different image cell portions, one for each synthetic image. The image object may extend over all such image cell portions and may thereby comprise features from all synthetic images.

When passing the viewing angles associated with a border between two image cell portions, there will be a flip between the two synthetic images seen. If the differences between the separate synthetic images are small between consecutive neighbouring image cell portions, a successive change in image appearance can be obtained. In other words, an animation can be produced. Such a gradual change can be of different kinds, such as, but not limited to, shape, size, orientation, position, colour, perceived depth or a combination of several of these parameters.

Figure 7A:
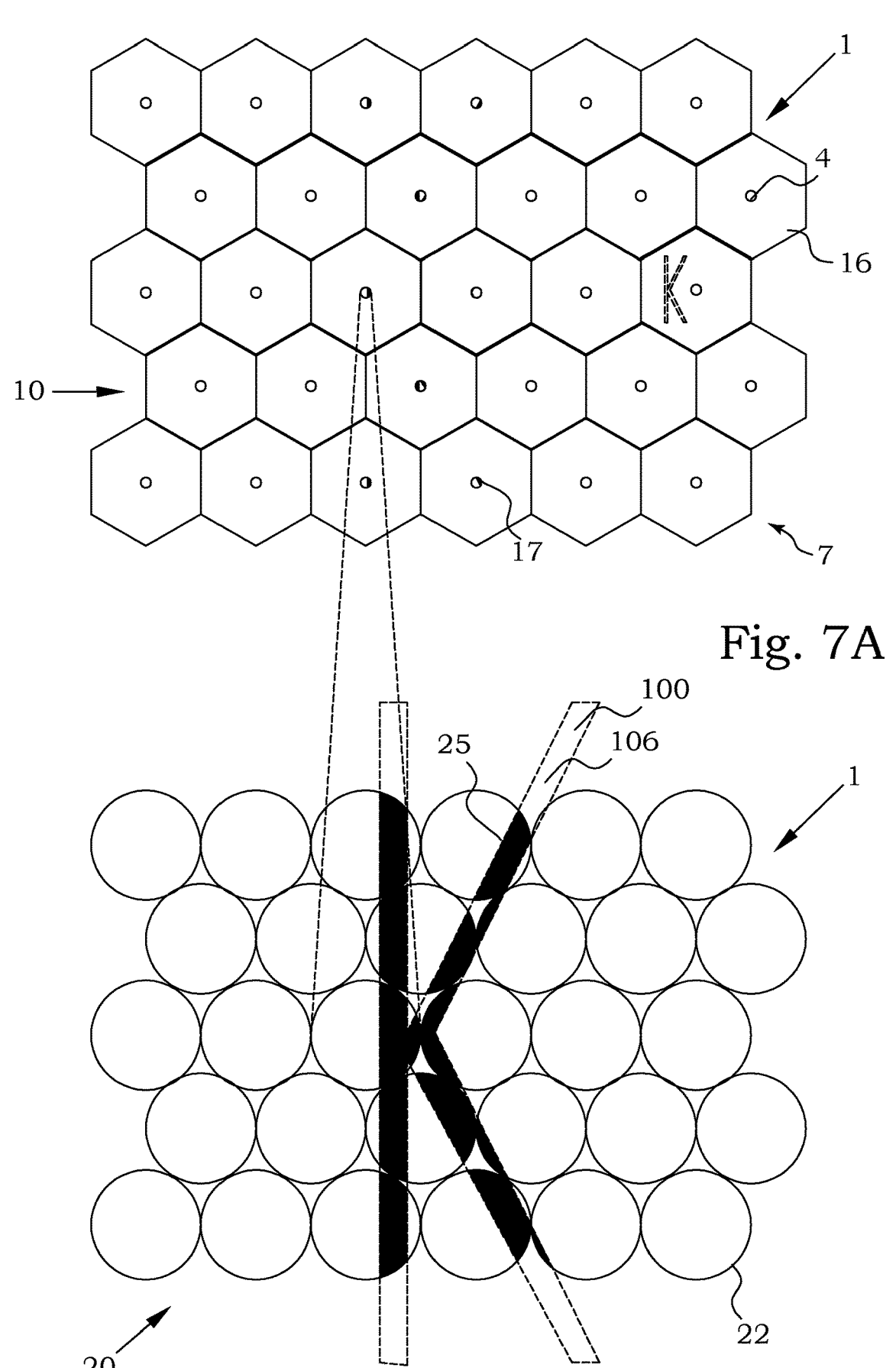

This can be schematically illustrated by the following figures. In FIG. 7A, a similar set-up as in FIG. 3A is shown. However, in this case the synthetic image device 1 is not a moiré device since the content of the different image cells will differ. The image layer 10 is divided in image cells 16 in an array 7 of image cells. Each image cell 16 is associated with a focusing element 22. In order to produce the "K" image, only the parts of the icon images within the image points 4 are necessary, thereby forming truncated icon images 17. Regardless of what is present outside these image points 4, a large synthetic image 100 of a synthetic image in the form of a "K", will anyway be seen when the device is viewed from the top. In this case, the image point 4 portion of the image object gives rise to an integral image 106, since it is based on non-repetitive truncations 17.

Figure 7B:
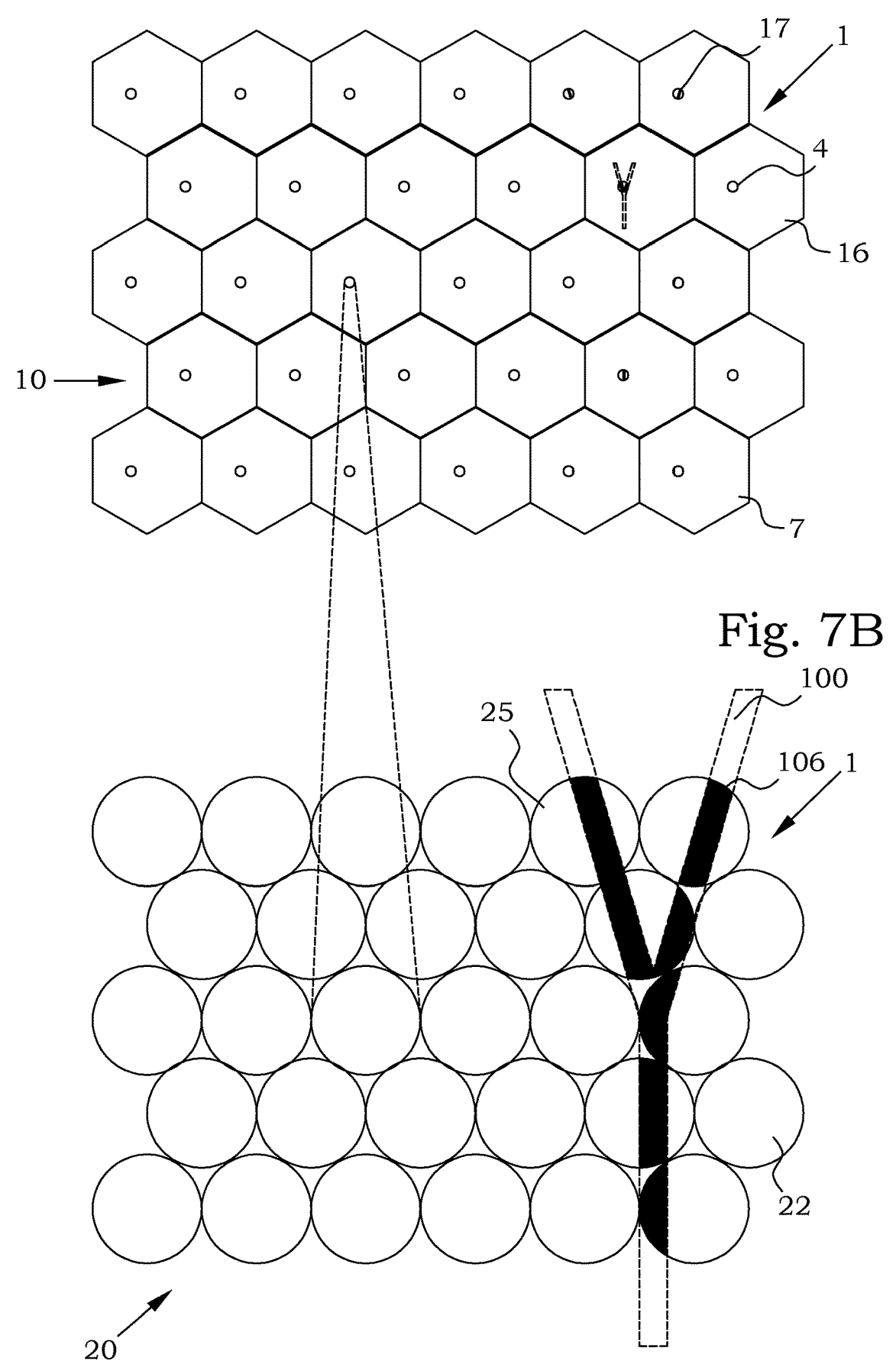

In FIG. 7B, the viewing angle is changed and consequently the image point 4 is shifted within the image cell 16. In this case, the truncated icon image 17 in this viewing angle is changed to the letter "Y" instead. If the intermediate image points between the ones giving the synthetic image in these two figures are designed to form intermediate designs between a letter "K" and a letter "Y", an animation of a gradual changing of the letter K into the letter Y can be achieved.

Figure 7C:
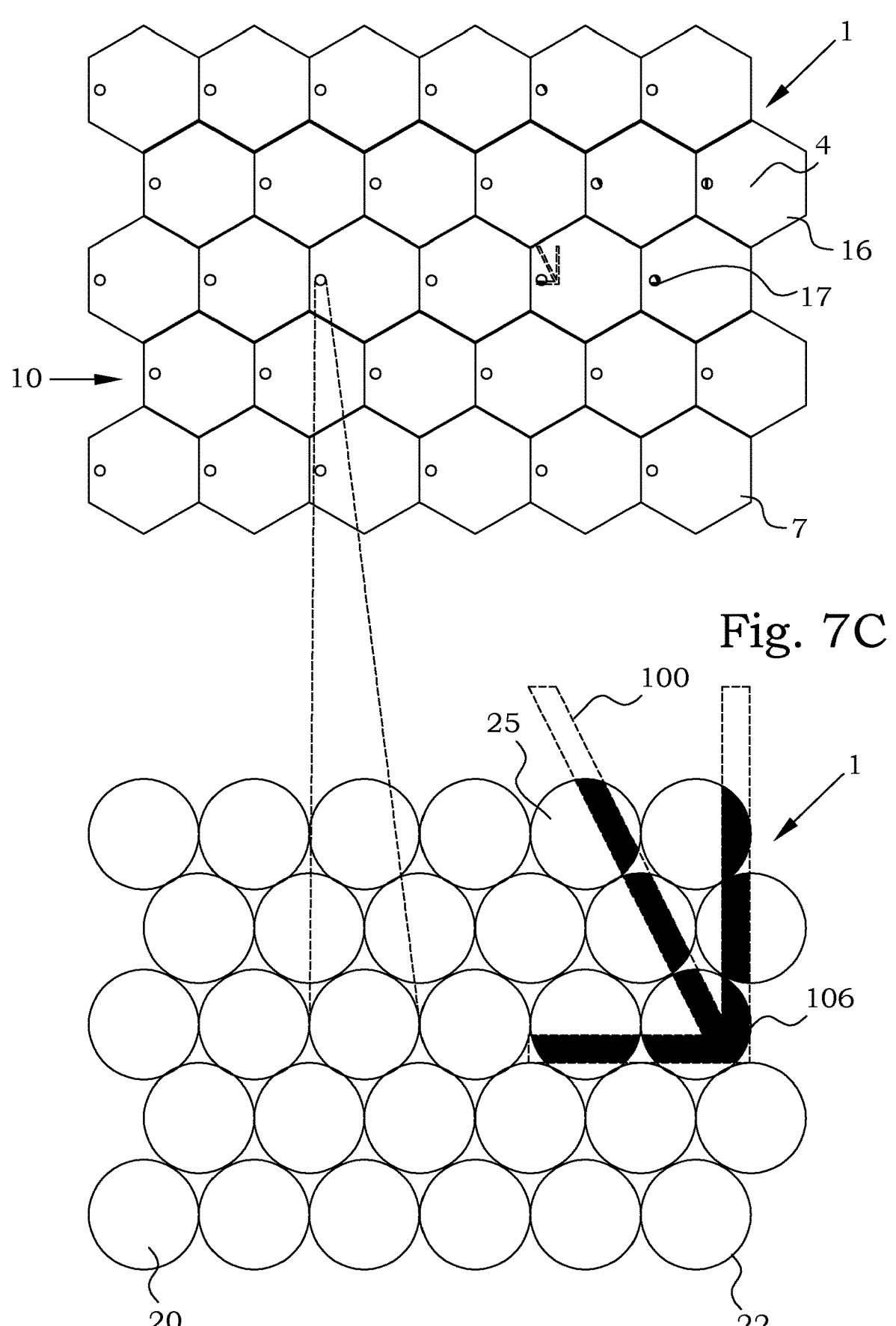

In FIG. 7C, yet another viewing angle is illustrated. In the image points 4 associated with this viewing angle, there are truncated icon images 17 giving rise to a heavily deformed "Y". Also here, only the image object features contained within the image point gives rise to the seen synthetic image 100.

In FIG. 7D, the situations of FIGS. 7A-C are compiled into one illustration. Within the marked image points 4, there are image information sufficient to provide the "K", "Y" and "distorted Y" in the three different directions, as schematically illustrated at the bottom of the figure. The remaining parts of the image object 12 of the image layer 10, outside the marked image points 4, may now be provided with features giving rise to other synthetic images. For instance, if an animation is requested, the areas of the image object 12 of the image layer 10 between the marked image points 4 may be filled by features giving rise to synthetic images being somewhere between the "K", "Y" and "distorted Y".

In this manner, the entire image cell 16 can be filled with e.g. truncated icon images 17 that will give rise to different synthetic images 100 in different directions, possibly giving an animation effect, going beyond expected three-dimensional parallactic behaviour.

In order to make such an animation pleasant to view and easy to comprehend, the changes between consecutive synthetic images should be small, which means that a larger number of image objects giving synthetic images have to be provided within respective image cell portions within the image cell. Since the total available space for the image cell is limited, more steps between consecutive synthetic images leads to smaller individual image cell portions.

When manufacturing a synthetic image device, the image layer is typically provided by means of printing on or embossing in a polymer film also comprising or being attached to the focusing element array. When the image layer has been formed on the polymer film, it is almost impossible to adapt any structures in this image layer. This means that any structures intended to be included in the image layer of the final product, regardless of being a matter of basic image design or being advanced image effects or being appearance enhancing measures, has to be provided in the printing/embossing. This also means that the definition of the structures to be printed/embossed has to comprise also any appearance-enhancing modifications or advanced image effects of the originally designed synthetical image or synthetical image animation. The definition of the image layer to be provided can be illustrated by a digital image model comprising an array of digital image cells.

Figure 8A:
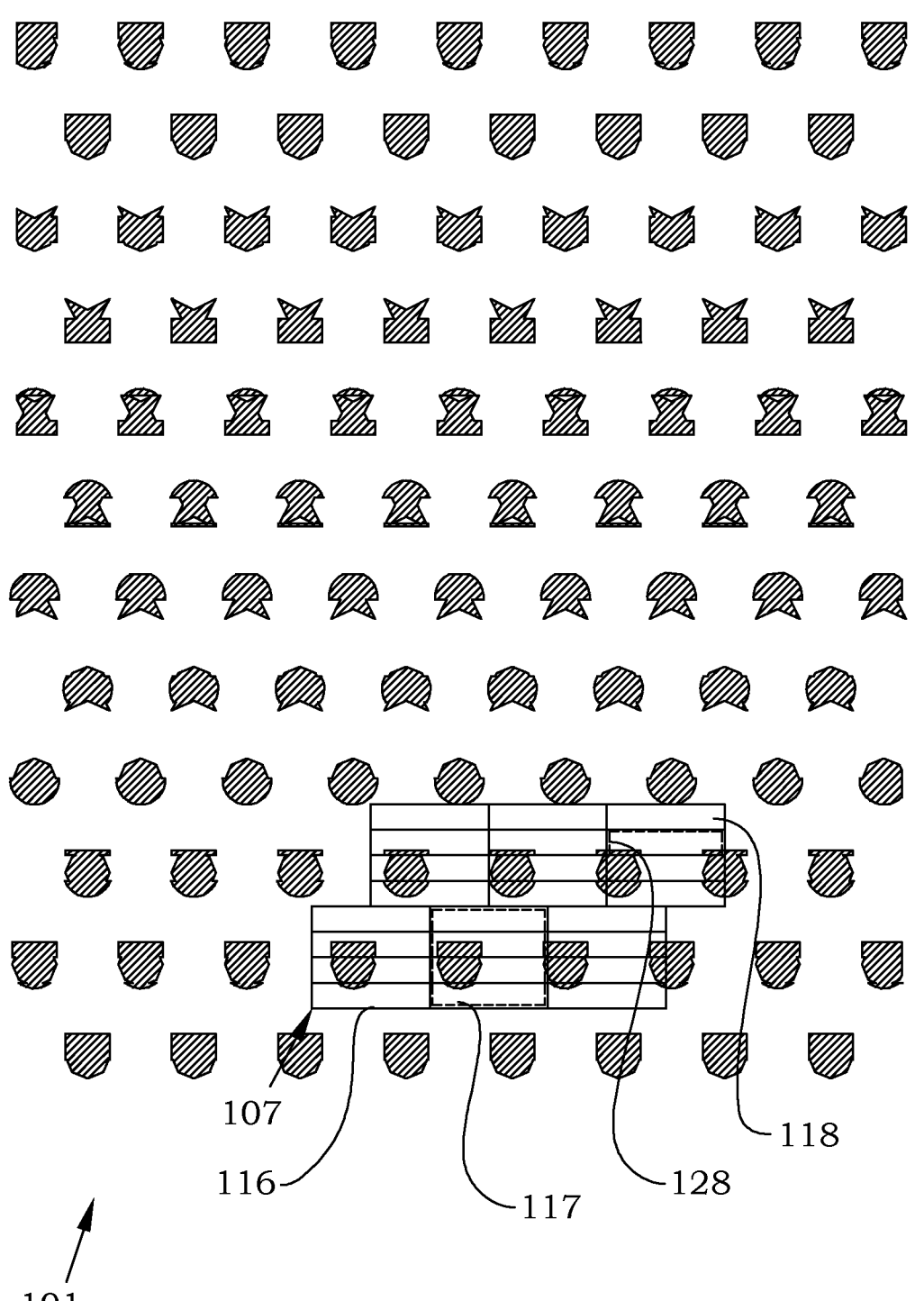
FIG. 8A illustrates a part of an embodiment of a digital image model for providing a synthetic image animation.

In FIG. 8A, a digital image model 101 of an example of a simple animation with 4 steps is illustrated. As the synthetic image device to be manufactured is tilted in the vertical direction, i.e. about a horizontal axis, the synthetic images intended to be produced by the image objects are a circle transforming via an octagon and a square into a star. In a preferred embodiment, the number of steps is of course larger to achieve a smoother transition, but in order to show the principles in an illustrative manner, the number of steps is kept small. The digital image model 101 is furthermore illustrated in a very high magnification. Typical sizes of the distance between neighbouring focusing elements in the final product may be in the range of 15-150 microns, which means that the associated size of the digital images cells 116 should be the same range.

The digital image model 101 comprises an array 107 of digital image cells 116, of which only a few are marked in the figure for viewability reasons. Each digital image cell 116 is associated with a digital image object 117, marked with a dashed line in one of the image cells. Each digital image cell 116 is in this example divided in four digital image cell portions 118, each related to a respective one of four different ranges of viewing angles. In the present embodiment, the digital image cell portions 118 have the shape of horizontal bands or stripes. Within each digital image cell portion 118, a digital sub-image 128 is provided. Since the intended synthetic image is to be an animation, the digital sub-images 128 in each digital image cell portion 118 are different. In the uppermost digital image cell portion, the digital sub-image 128 is designed to result in an integral synthetic image of a star, together with digital sub-image 128 of the uppermost digital image cell portion of other digital image cells. In the second uppermost digital image cell portion, the digital sub-image 128 is designed to result in an integral synthetic image of a square. In the next lower digital image cell portion, the digital sub-image 128 is designed to result in an integral synthetic image of an octagon. In the lowest digital image cell portion, the digital sub-image 128 is designed to result in an integral synthetic image of a circle. The variation of the digital sub-images 128 over the area of the illustrated part of the digital image model 101 is a feature connected to integral image devices. The variation depends on the pattern of the digital icon image of each viewing angle and the position of that pattern vs the pattern formed by the digital image portions 118 of each viewing angle.

Figure 8B:
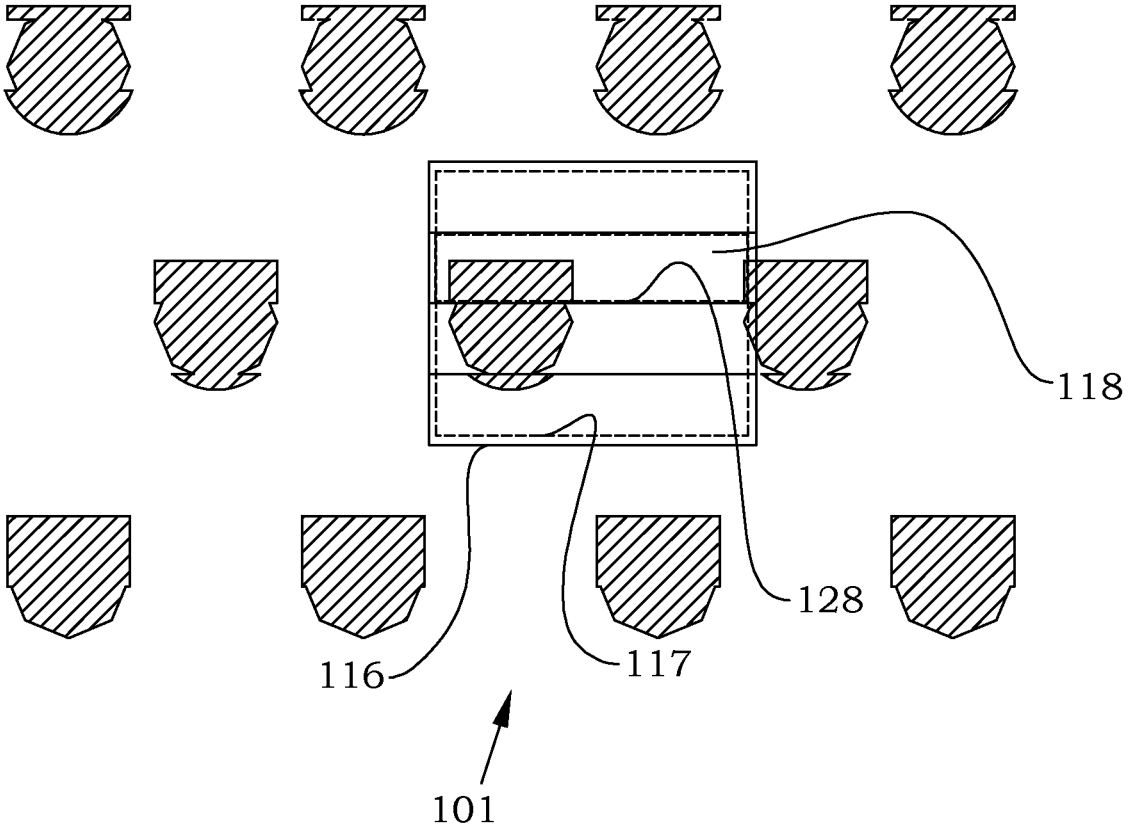
FIG. 8B illustrates an enlarged part of FIG. 8A with a digital image cell and its digital image cell portions marked with boxes for the purpose of understanding their extent.

FIG. 8B shows a close-up of some of the structures of the digital image model 101. It is here seen that the digital image object 117 of the digital image cell 116 is composed by the digital sub-images 128 of each digital image cell portion 118. Depending on the position within the digital image model 101, the digital image object 117 comprises parts associated with the different intended integral synthetic images that differs in size and shape.

Synthetic images are generally associated with an apparent depth or height (i.e. negative depth). This is usually considered as a "strange" feature since the device itself is a thin plane structure. A synthetic image floating above the surface of the device or which seems to be buried within the support of the device is non-natural at a first glance. An evolution of that optical effect would be to provide consecutive small shifts in depth upon changing the viewing angle. The result would then be that an image would seem to "pop out" from the surface or disappear further into the support material. Since magnification and perceived depth are connected to each other (according to e.g. equation (3)), such a type of perceived depth change upon changing viewing angle is here denoted as a zoom effect. Such eye-catching optical effects would be useful for any types of security or aesthetic devices. The zoom effect may be presented alone or in combination with other optical effects, as will be discussed further below.

Figure 9:
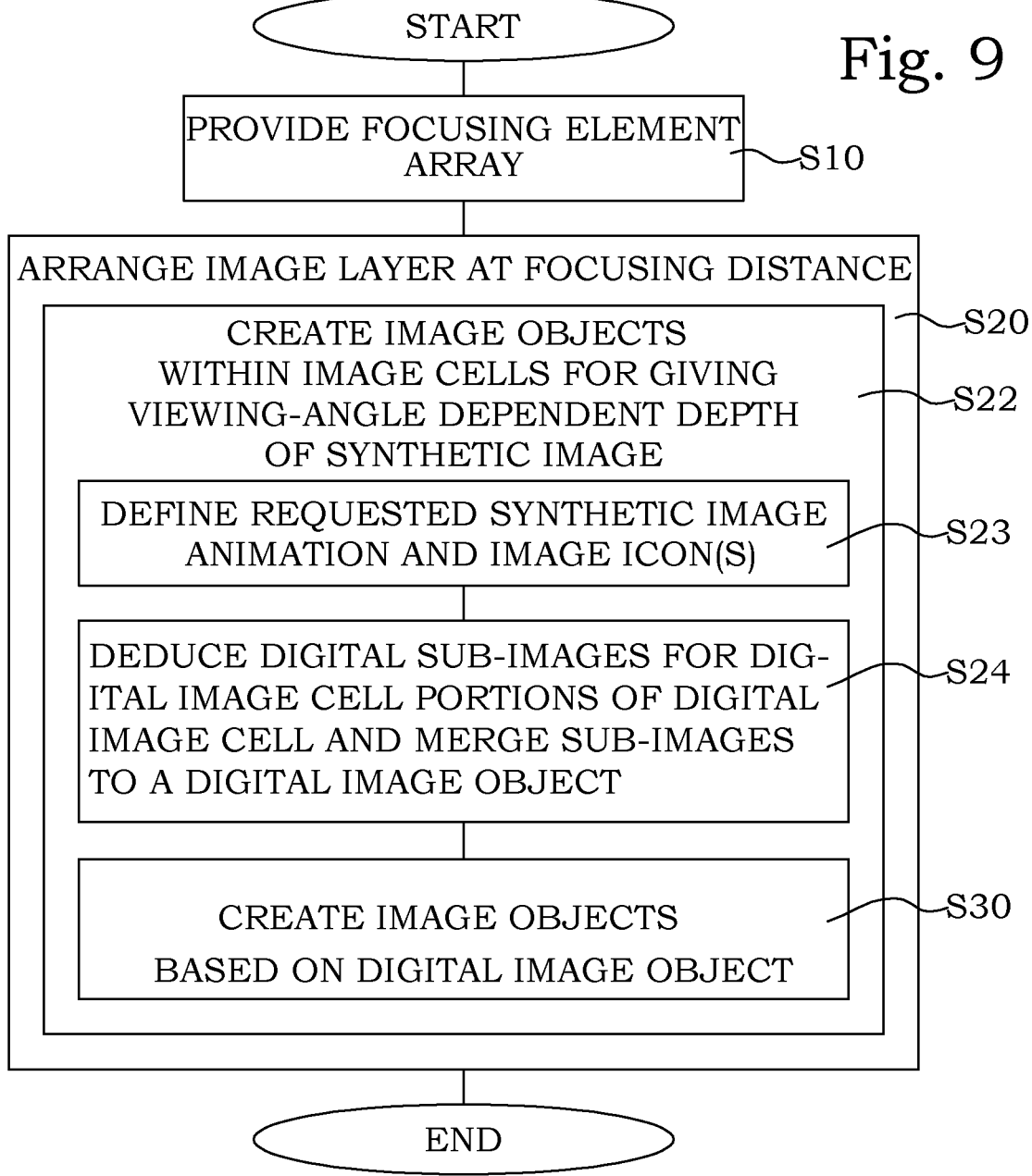
FIG. 9 is a flow diagram of steps of an embodiment of a method for manufacturing a synthetic image device.

An embodiment of a method for manufacturing a synthetic image device is illustrated in FIG. 9. In step S10, a focusing element array is provided. In step S20, an image layer is arranged in a vicinity of a focal distance of focusing elements of the focusing element array. Thereby a synthetic image composed of enlarged portions of the image layer becomes perceivable for a viewer. The image layer comprises an array of image cells, wherein each image cell is associated with a respective focusing element of the focusing element array. The array of image cells has a same symmetry and element distance as the focusing element array. Thereby, an image point at each position within an image cell cooperates with image points at corresponding positions within other image cells to give rise to a synthetic image in an associated viewing direction. The step S20 of arranging comprises the step S22, of creation of a respective image object within each respective one of said image cells. The image objects are arranged such that an animation becomes perceivable. The animation comprising a series of synthetic images perceivable in series as the viewing direction changes from a first viewing direction to a second viewing direction. The image objects are such that each one of the synthetic images of the series is perceivable at a respective (stereoscopic) perceivable depth changing between the synthetic images of the series of synthetic images.

The above method thus produces a synthetic image device. The synthetic image device comprises a focusing element array and an image layer. The image layer is arranged in a vicinity of a focal distance of focusing elements of the focusing element array, whereby a synthetic image composed of enlarged portions of the image layer becomes perceivable for a viewer. The image layer comprises an array of image cells, wherein each image cell is associated with a respective focusing element of the focusing element array and wherein the array of image cells has a same symmetry and element distance as the focusing element array. Thereby, an image point at each position within an image cell cooperates with image points at corresponding positions within other image cells to give rise to an image in an associated viewing direction. The image objects are such that an animation becomes perceivable. The animation comprising a series of synthetic images perceivable in series as a viewing direction changes from a first viewing direction to a second viewing direction. The image objects are such that each one of the synthetic images of the series is perceivable at a respective (stereoscopic) perceivable depth changing between the synthetic images of the series of synthetic images.

Since it is very difficult to modify an image layer once it is printed or embossed, any definition of a requested synthetic image animation and possible modification thereof, as mentioned earlier and as will be discussed further below, is preferably performed before the actual image objects are formed in the image layer. In other words, in one preferred embodiment, in a step S23, a requested synthetic image animation to be produced by the synthetic image device is designed and defined. The definition of the requested synthetic image animation is typically made by use of mathematical geometry definitions and has a viewing angle dependency. In a step S24, an array of digital image cells of a digital image model is deduced, wherein each of the digital image cells comprises a digital representation of a shape and position of the digital image cell. The digital image model further comprises digital descriptions of digital image objects within the respective digital image cell. The digital descriptions of digital image objects are deduced from the definition of the requested synthetic image animation as being transformed by the operation of the array of focusing elements. This transformation consists of a mapping of an angle dependency of a requested appearance of a surface of a focusing element into a position dependency of the requested appearance of a surface of a focusing element at the corresponding digital image cell. In other words, a contents of each respective image object is preferably determined using a respective digital image object of a digital image model, wherein each digital image object is derived by deducing for each range of viewing directions a respective digital sub-image for a respective digital image cell portion of the respective digital image cell. Subsequently, the digital sub-image of each digital image object are preferably merged to form the respective digital image object. Thereby, each digital image cell portion corresponds to a portion of the image object visible through the respective focusing element in the respective viewing direction in a final product.

In step S30, the image objects are created in the image layer according to the array of digital image objects of the digital image model. This step is typically performed according to processes, as such known in prior art. Typically, such processes may comprise manufacturing of embossing tools with structures defined according to the array of digital image objects of the digital image model and embossing of an image layer of the synthetic image device by that embossing tool. Alternatively, such processes may comprise manufacturing of printing tools with structures defined according to the array of digital image objects of the digital image model and printing of an image layer of the synthetic image device by that printing tool. Further alternatives may comprise control of a printer head, e.g. in a laser printer, based on the content of the array of digital image objects. All these processes of transferring an array of digital image objects, defined by mathematical or other digital means, into physical structures at an image layer at a synthetic image device are, as known by any person skilled in the art and not further discussed.

In other words, in one embodiment, the creation of image objects in each image cell comprises embossing the image objects in a polymer layer on, or printing the image objects on, a polymer substrate presenting the focusing elements.

In one embodiment, the creation of image objects in each image cell comprises forming a tool for the embossing or printing with recesses formed according to the image objects to be created.

In one embodiment, the printing comprises controlling of a printer head to print the image objects to be created.

Alternatively, the sub-images for each digital image cell portion may be derived using a mathematical transform deriving the sub-images from the digital icon images.

The basic procedure thus starts with a definition of the icon images to be used in a depth-varying synthetic image animation as well as a description of the depth behaviour of such images. These requested images to be part of the animation is thus, together with the requested depth behaviour, the design-related input to the manufacturing process. This design can be provided by any external or internal process and is thus the goal of the synthetic images produced by the synthetic image device. Once this design is set, a number of process steps are performed, which are not related to design of the image, but instead to issues necessary for providing the perceptible effect of the synthetic image involving an apparent depth dependent on the viewing angle. The first of these steps is the mathematical or digital transformation of such a synthetic image animation into a definition of a digital image model of digital image objects, as an array of digital image cells. When the array of digital image cells of the digital image model is defined, the physical image layer is created according to this digital image model. The entire transforming and possible adaptations of the digital image objects are thus preferably performed in the digital regime before creating any physical corresponding structures.

One approach comprises a definition of the requested synthetic image animation in a digital manner, where the shape, color, position, orientation and size of the digital icon images and the intended perceived depth of the synthetic image is expressed as a function of the viewing angle in the digital image model. The digital icon image may continuously change its appearance for different viewing directions. The digital image model can then in one embodiment be a mathematical focusing-element-array transform of the digital icon image. Thereby, each position within the digital image cells is a part transform of a respective viewing angle of the alterations of the synthetic image.

In other words, the transform transforms the viewing-angle dependence of the digital icon image to a position dependence within each digital image cell of the digital image model, thereby creating the requested digital image objects which the (physical) image objects are based on.

Such a mathematical transformation may be possible to perform for simple designs of the requested synthetic image animation. However, for more complex images and animation sequences, the pure mathematical approach may be extremely complex and not practically implementable. In such cases, the somewhat different approach of FIGS. 10A-10I may be used for deducing the definition of the array of digital image objects of a digital image model.

Figures 10A, 10B:
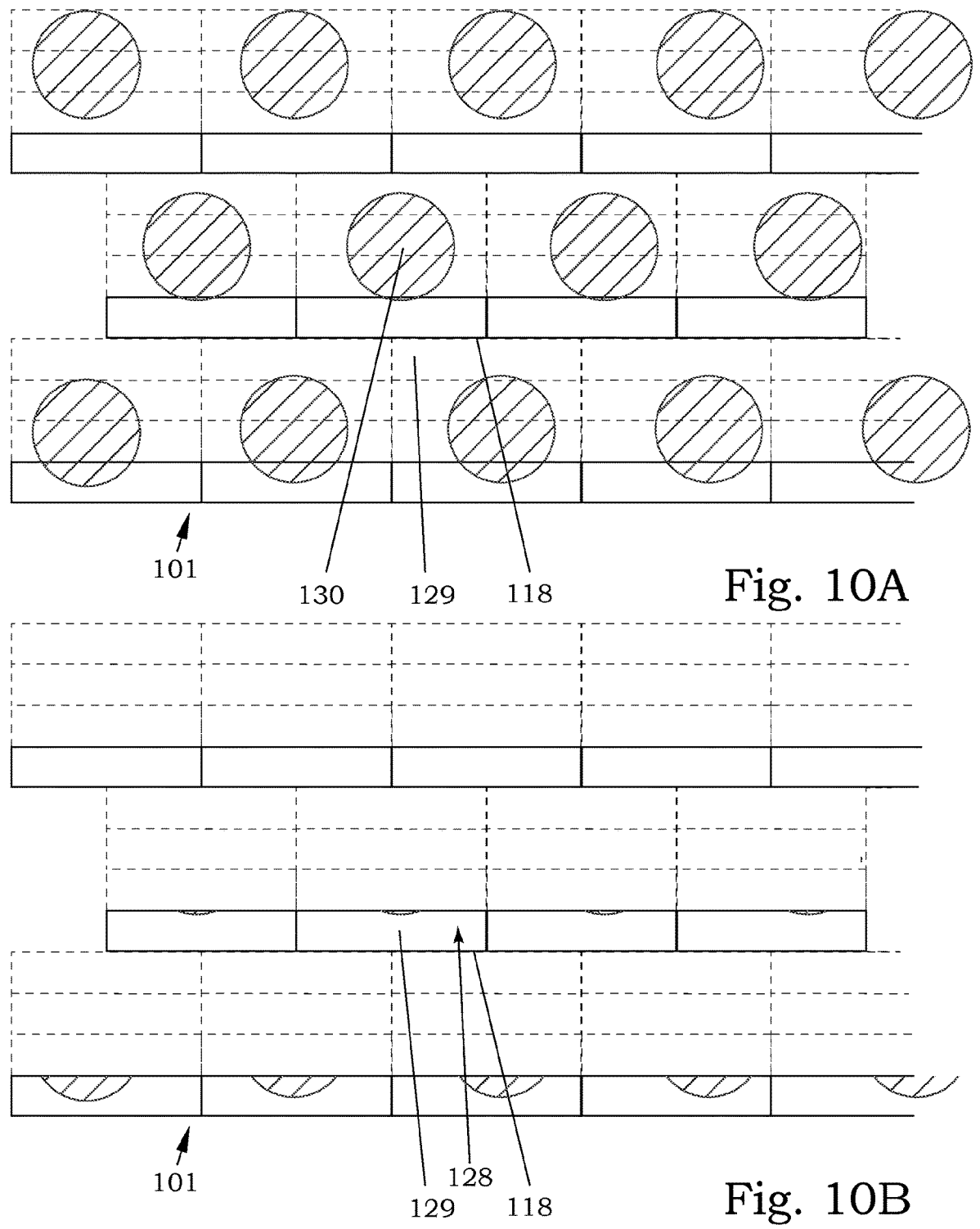
FIG. 10A illustrates schematically the overlap between a pattern of repeated digital icon images and digital cell portions related to one viewing angle.
FIG. 10B illustrates schematically how the digital icon image pattern of FIG. 10A has been cropped/truncated/masked by the pattern of the digital image cell portions thereby deriving digital sub-images for each digital image cell portion.

FIGS. 10A-J illustrate different aspects of providing depth varying animations. FIG. 10A illustrates an array of digital image cell portion 118 of a digital image model 101. The positions of the digital image cell 116 and the other digital image cell portions 118 are indicated by dotted lines. An array of digital icon images 129 is placed onto the digital image cell portions 118. The relative spacing of the digital icon images 129 is adapted to result in a predetermined first apparent depth, in association with a focusing element array with a predetermined pitch. This is noticed since the relative position of each digital icon images 129 and a corresponding digital image cell portions 118 is different over the surface of the digital image model 101. A registration point 130 is assigned in the array of digital icon images 129, typically within one of the digital icon images 129. Parts of the digital icon images 129 overlap with the indicated digital image cell portions 118. In FIG. 10B, the same situation is illustrated, but with the non-overlapping parts of the digital icon images 129 removed, leaving digital sub-images 128 comprising a part of respective original digital icon image 129.

Figures 10C, 10D:
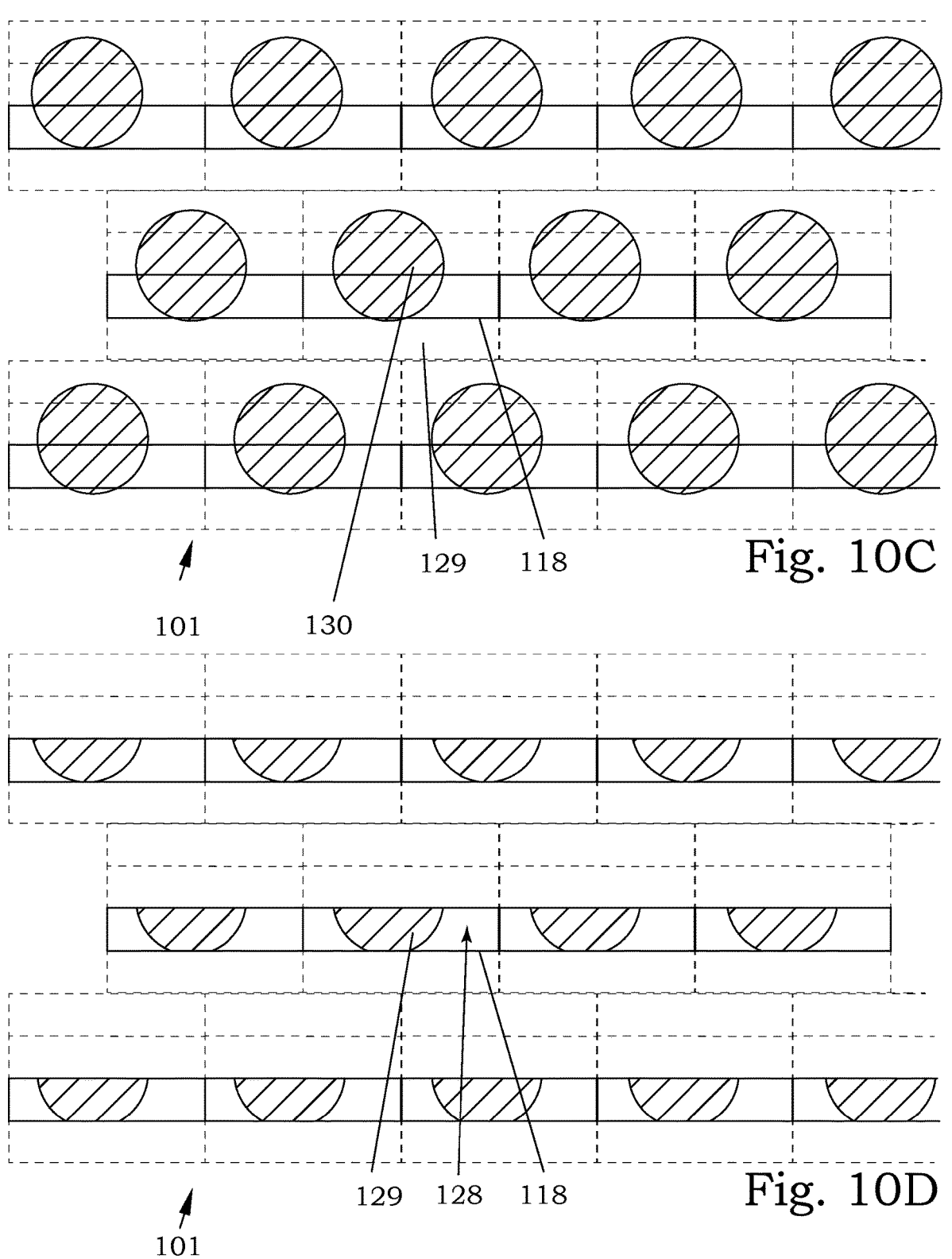
FIG. 10C illustrates schematically the overlap between a pattern of repeated digital icon images and digital cell portions related to another viewing angle.
FIG. 10D illustrates schematically how the digital icon image pattern of FIG. 10C has been cropped/truncated/masked by the pattern of the digital image cell portions thereby deriving digital sub-images for each digital image cell portion.

FIG. 10C resembles FIG. 10A, but for another digital image cell portion 118. The array of digital icon images 129 is here also adapted to result in a predetermined second apparent depth, different from the first apparent depth. This means that the pitch of the array of digital icon images 129 is different compared to FIG. 10A. This is noticed since the position of each digital icon images 129 is different compared with FIG. 10A, except for the registration point 130. In FIG. 10D, the same situation is illustrated, but with the non-overlapping parts of the digital icon images 129 removed, leaving digital sub-images 128 comprising a part of respective original digital icon image 129. Since the positions of the current digital image cell portions 118 differ from the ones of FIG. 10A, the digital sub-images 128 will be different.

Figures 10E, 10F:
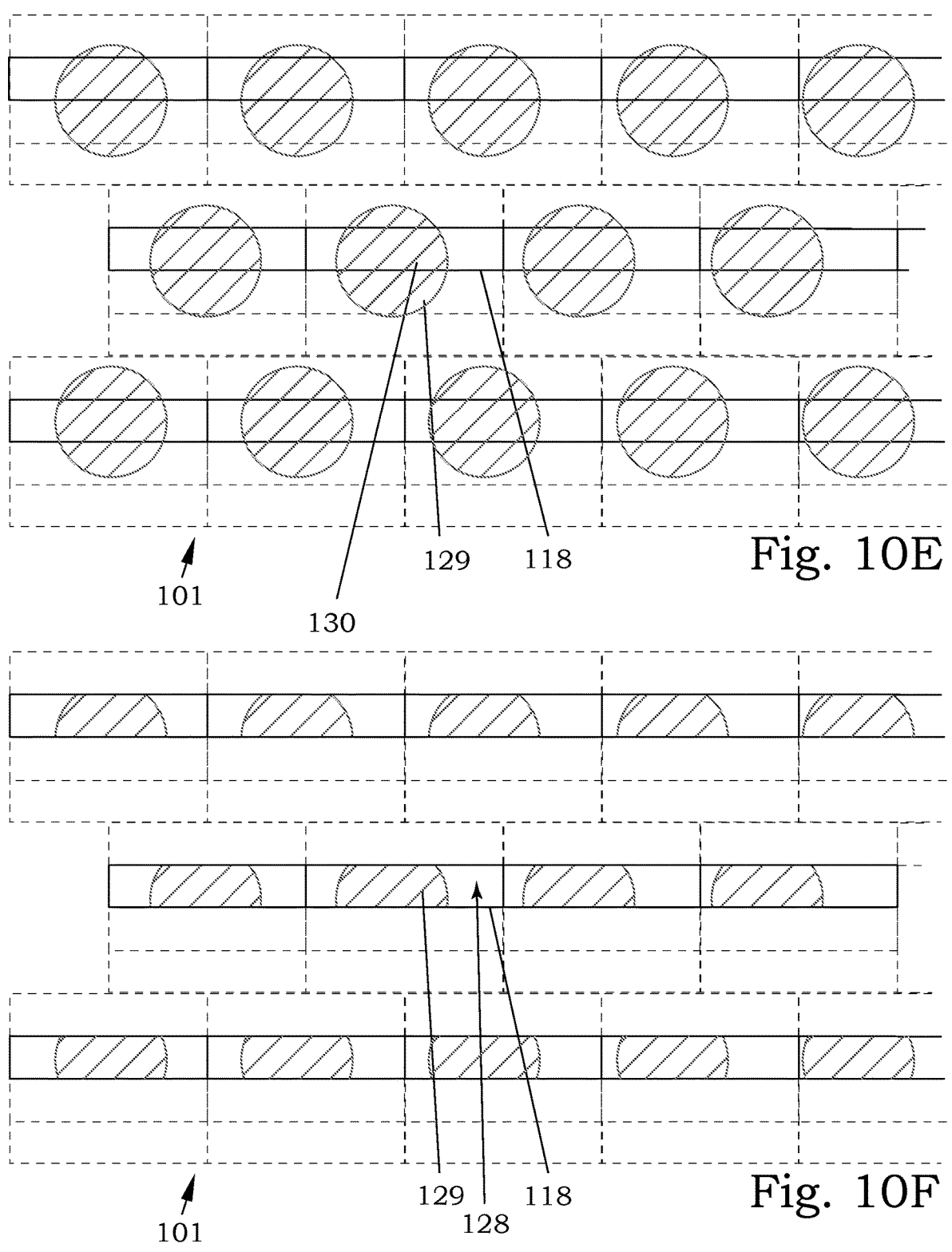
FIG. 10E illustrates schematically the overlap between a pattern of repeated digital icon images and digital cell portions related to yet another viewing angle.
FIG. 10F illustrates schematically how the digital icon image pattern of FIG. 10E has been cropped/truncated/masked by the pattern of the digital image cell portions thereby deriving digital sub-images for each digital image cell portion.
Figures 10G, 10H:
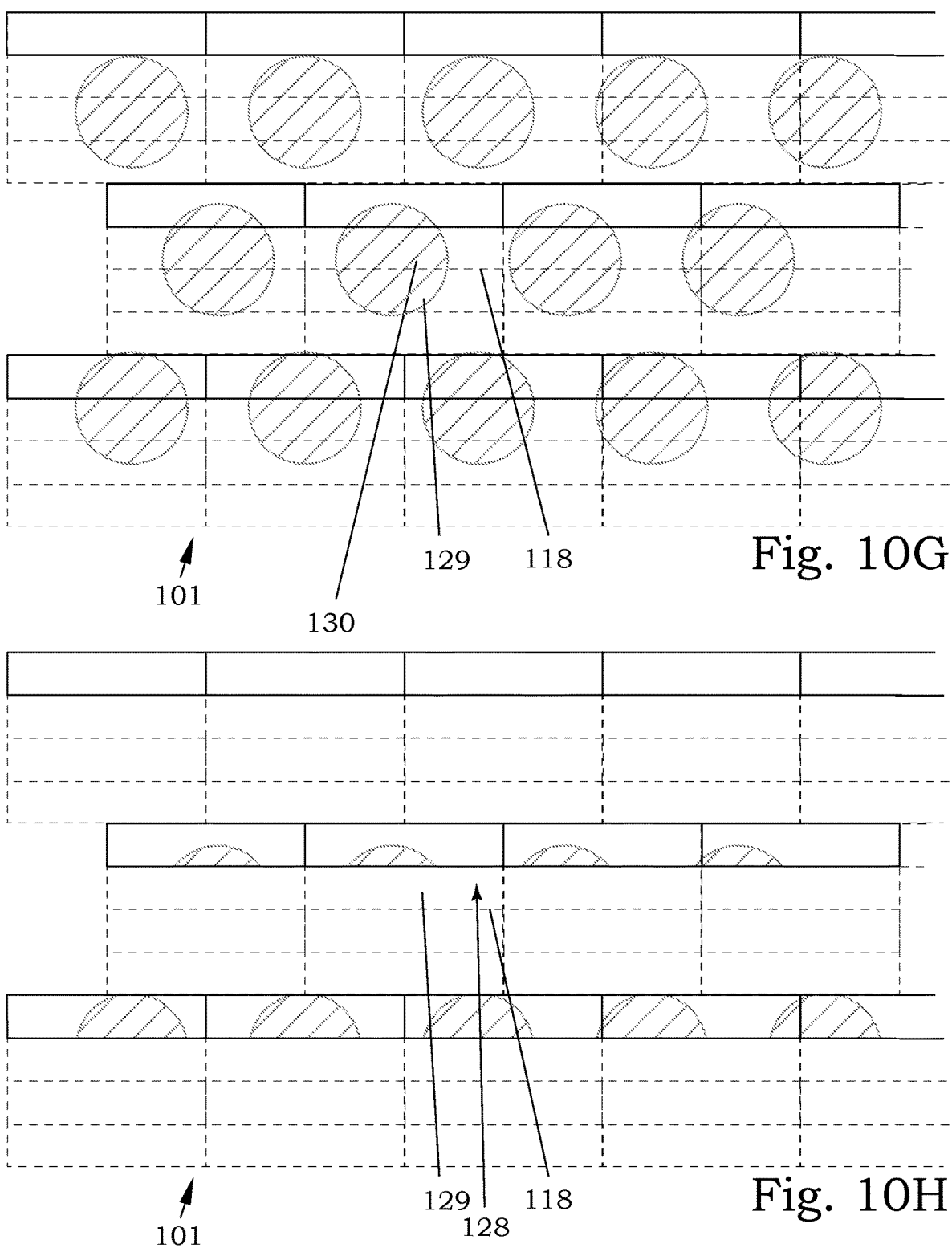
FIG. 10G illustrates schematically the overlap between a pattern of repeated digital icon images and digital cell portions related to yet another viewing angle.
FIG. 10H illustrates schematically how the digital icon image pattern of FIG. 10G has been cropped/truncated/masked by the pattern of the digital image cell portions thereby deriving digital sub-images for each digital image cell portion.

FIGS. 10E and 10F illustrates the same situations, but for a third set digital image cell portions 118. FIGS. 10G and 10H illustrates the same situations, but for a fourth set digital image cell portions 118.

Figure 10I:
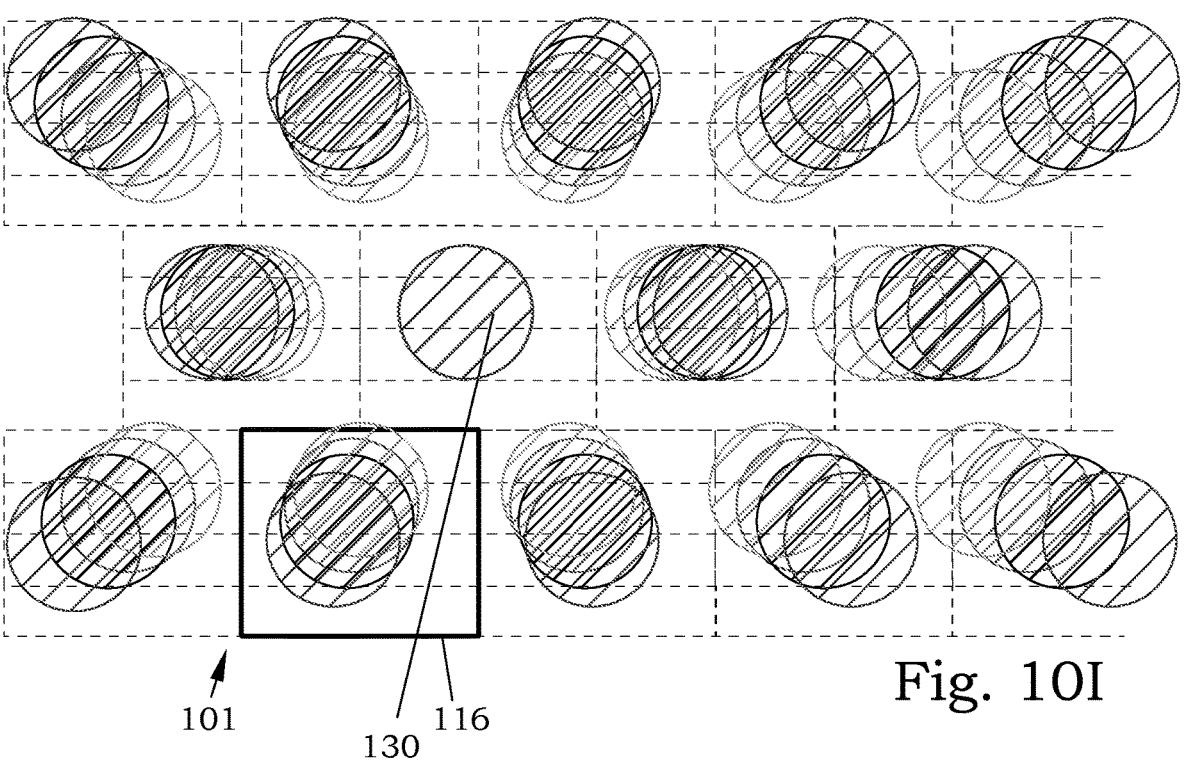
FIG. 10I is a merging of FIGS. 10A, 10C, 10E and 10G.
Figure 10J:
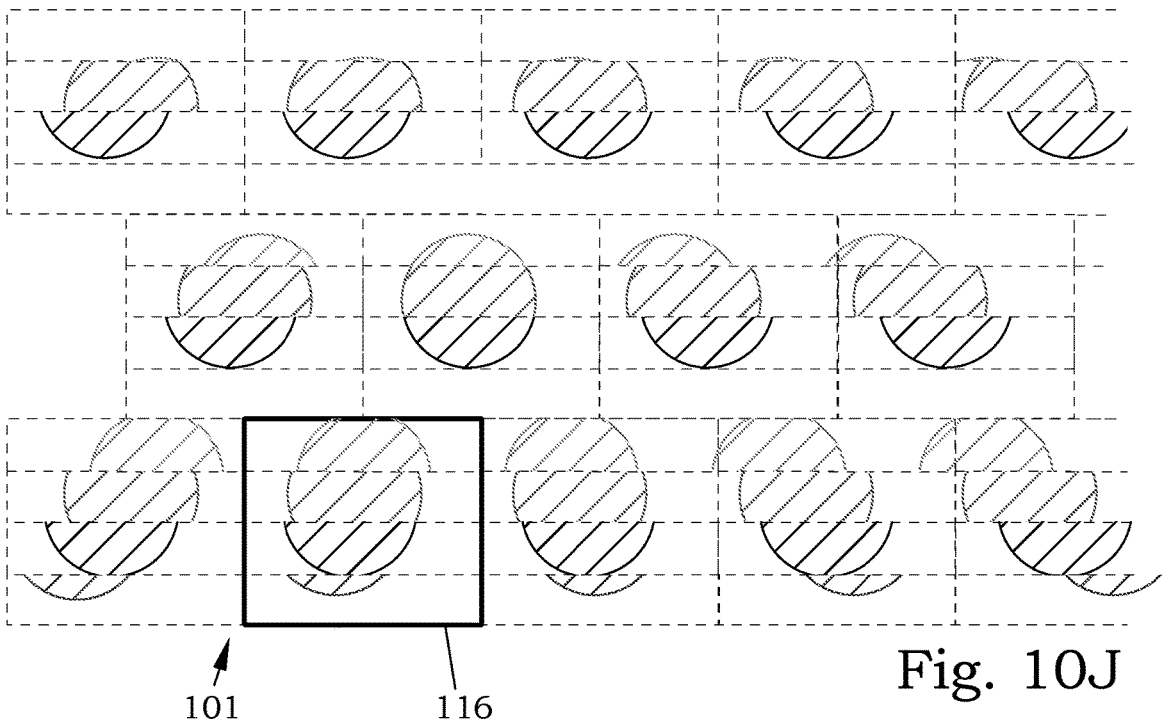
FIG. 10J is a merging of FIGS. 10B, 10D, 10F and 10H.

In FIG. 10I, the FIGS. 10A, 10C, 10E and 10G are combined into one illustration. In FIG. 10J, the FIGS. 10B, 10D, 10F and 10H are combined into one illustration. The differences between the different sets of digital image cell portions 118 are obvious, and the differences become more pronounced when the distance to the registration point 130 increases. The position of the registration point 130 corresponds to the position on the synthetic image device at which the depth change causes a perceived motion that is perpendicular to the surface of the synthetic image device. In principle, the registration point could be assigned to a position outside any digital icon image, resulting in that the synthetic image will perform a depth change accompanied by a translation movement. This may be utilized to simulate a depth change in a non-perpendicular direction.

Figure 10K:
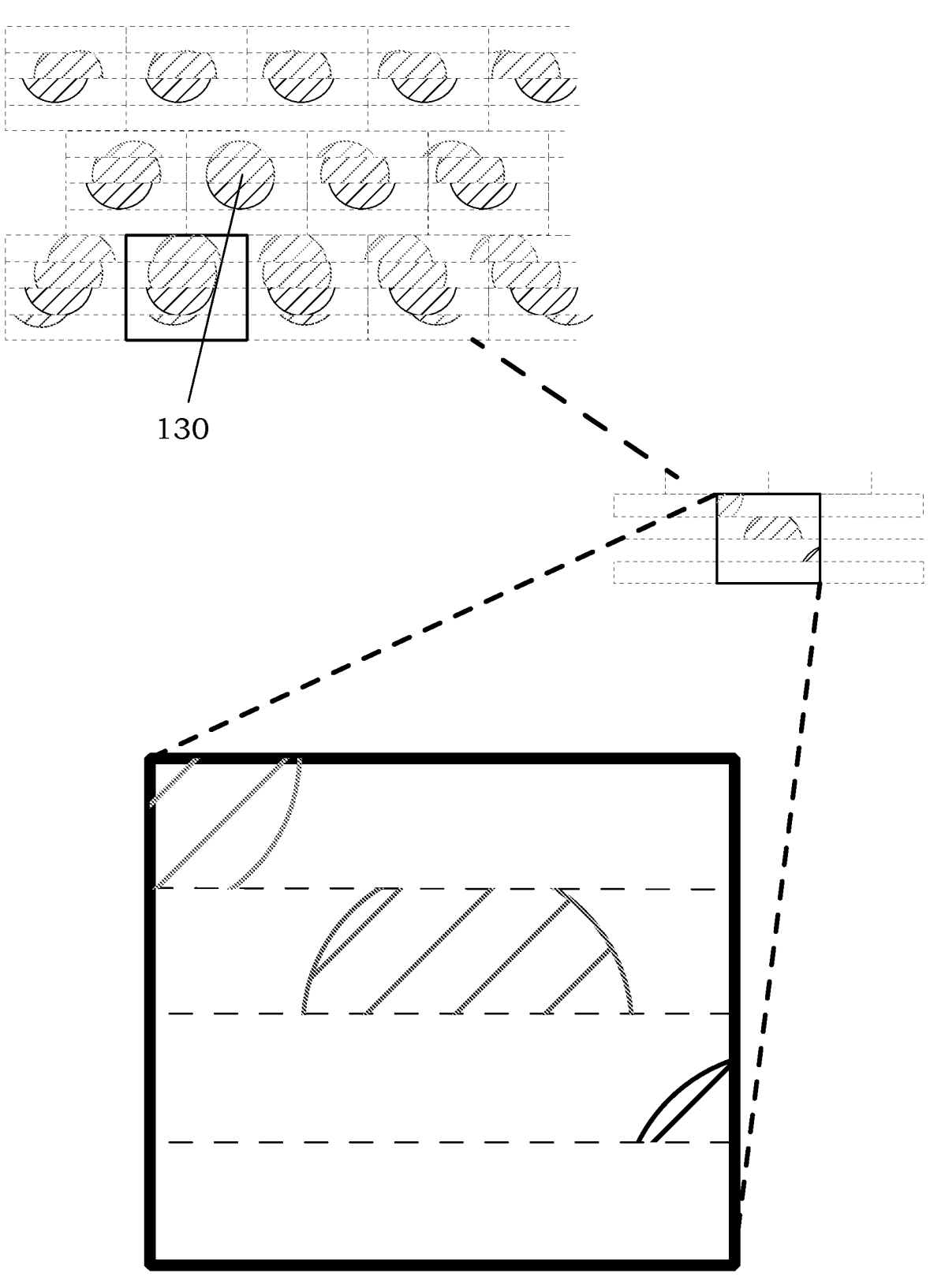
FIG. 10K illustrates schematically the pattern of a digital image cell situated far from a registration point of the pattern.

FIG. 10K illustrates a larger portion of a digital image model 101. One digital image cell 116 positioned at a relatively large distance 131 from the registration point 130 is enlarged. In this enlarged portion, it is seen that the digital image object 117 composed by the different digital sub-images 128 becomes very distorted. The composed digital image object 117 comprises thin slices of structures that are spread out over the area of the digital image cell 116. Furthermore, the structures of neighbouring slices may also be associated with different parts of the intended synthetic image. Synthetic images emanating from such partitioned thin structures are often perceived by a viewer as having a poor quality due to sudden transformations of parts of the synthetic image. The animation of the synthetic image thereby tends to lose its smoothness. As will be discussed further below, preferred embodiments are restricted in this sense.

In the embodiment above, the digital icon image associated with each synthetic image of said series of synthetic images remains unchanged between the synthetic images of the series of synthetic images. However, the digital icon image associated with each synthetic image of said series of synthetic images may alternatively in other embodiments be modified for each of said synthetic images, such as by change of shape, size, color, (lateral) position, and/or orientation. As an example, the depth-changing techniques of FIGS. 10A-K may be combined with the shape changes caused by image layers produced according to the digital image model of FIG. 8A.

As shown in the above described figures, the sub-images for each viewing direction may be deduced by:

a)

creating for each synthetic image of the series of synthetic images a digital pattern of a digital icon image 129. The digital pattern has the same symmetry as the array of focusing elements and the digital pattern is defined at least by a pattern spacing between repeating digital icon images. The pattern spacing is chosen to enable perception at the perceivable depth of the respective synthetic image, and b)

based on the digital pattern derive the respective digital sub-images 28 by digitally masking the digital pattern using a mask pattern corresponding to the digital image cell portions 118 of the respective range of viewing direction. The perceived depth of each synthetic image is governed mainly by the spacing of the digital icon images.

Figure 11:
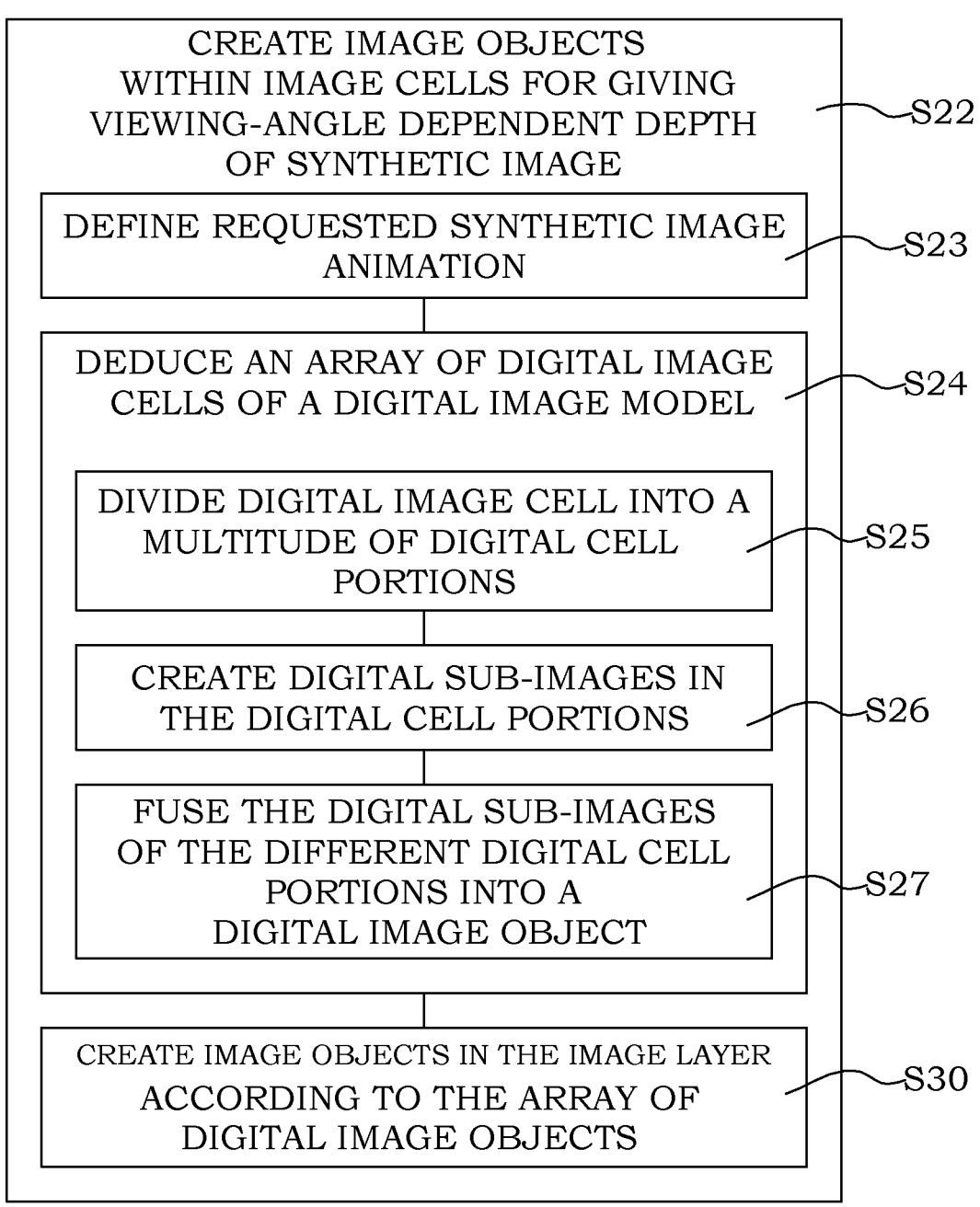
FIG. 11 is a flow diagram of part steps of an embodiment of step S22 in FIG. 9.

FIG. 11 illustrates one preferred embodiment of step S22 of creating image objects. Step S24 of deducing an array of digital image cells of a digital image model comprises step S25, in which each digital image cell is divided into a multitude of digital image cell portions. In step S26, for the digital cell portions, digital sub-images 128 are created, which together with digital sub-images 128 of corresponding digital cell portions of other digital image cells, when transformed as they would have been viewed via an associated focusing element, give rise to a synthetic image corresponding to a digital image model, continuously changing its appearance for different viewing directions.

In step S27, which may be optional, the digital sub-images of each digital cell portion within each digital image cell are fused into a digital image object of the digital image cell. Hence, the digital image objects extend over all digital cell portions of a digital image cell. Such a fusion can also be combined with a modification of the digital sub-images 128 in the vicinity of the borders between the different digital cell portions in order to achieve a smooth continuous image object without sharp structures. The creation of image objects in the image layer in step S30 is then performed according to the digital image object of each digital image cell.

Figure 10L:
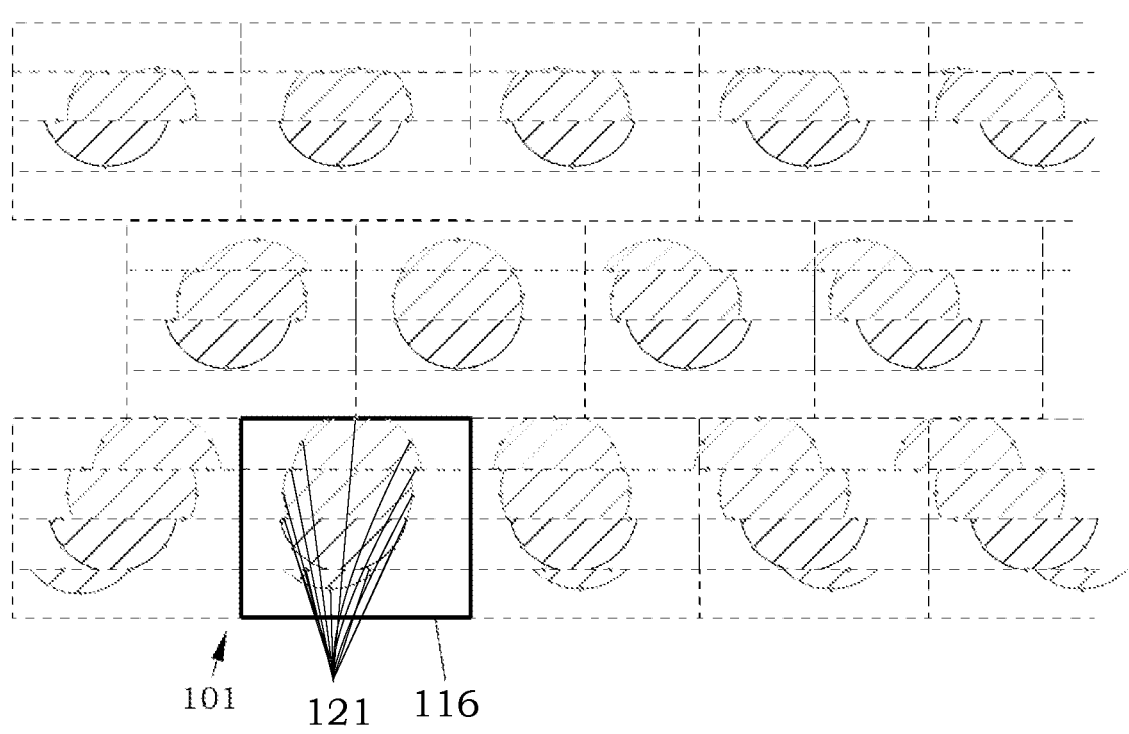
FIG. 10L illustrates the merging of FIG. 10K with point intended for spline interpolations.
Figure 10M:
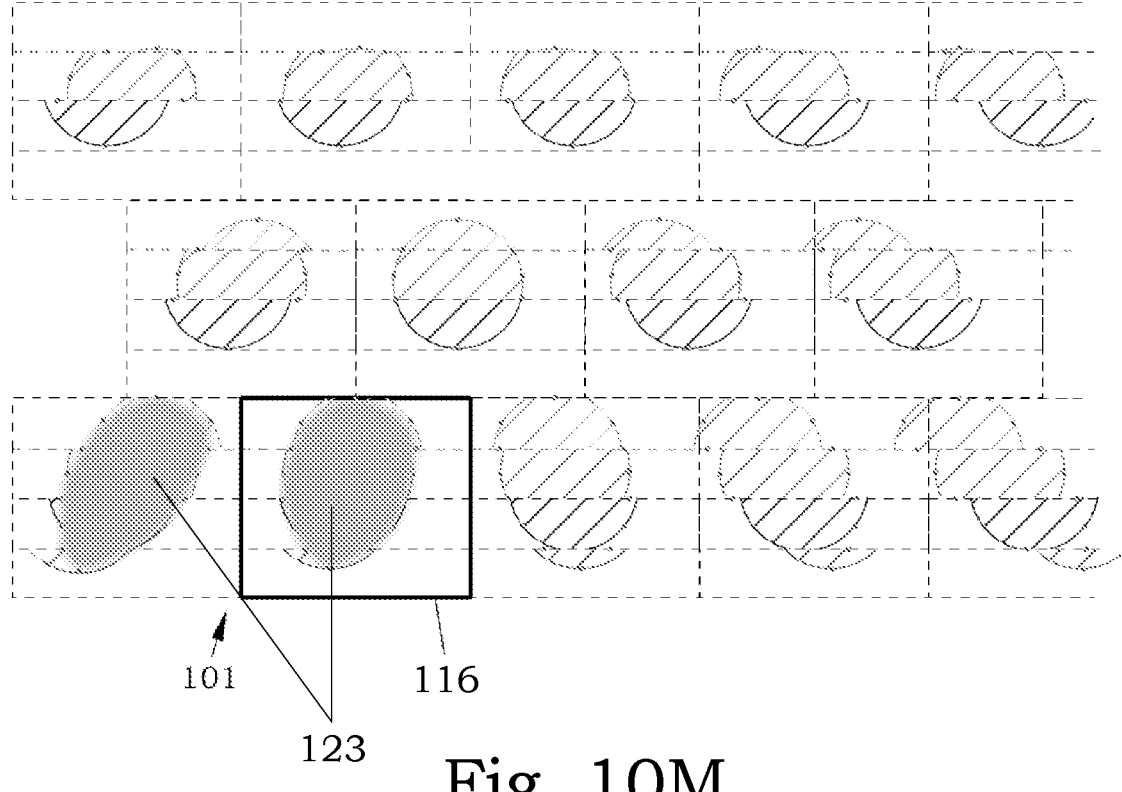
FIG. 10M illustrates the merging of FIG. 10K with a B-spline approximation performed for two of the cells.

One possible way to perform such a fusion of step S27 is illustrated by FIGS. 10L and 10M. The image objects of FIG. 10J are used as a starting point. In the digital image cell 116, a number of points may be defined, which subsequently is intended to create spline interpolations. In FIG. 10L, the points have been selected as three types of points. A first type of points is an average point between neighbouring digital cell portions, located at the borders of the digital image cell portions 118. A second type of points is a point located in the middle of each digital image cell portions 118. A third type of points is a point at the extremities in the digital image cell portions 118 where the structures only reaches one side of the digital image cell portions 118. These points are marked as 121 in the FIG. 10L.

In FIG. 10M, for each group of points, within two digital image cells 116, a fused digital image object 123 is created using for example a B-spline approximation.

In one embodiment, each digital cell portion is associated with a respective associated range of viewing directions.

Figure 12:
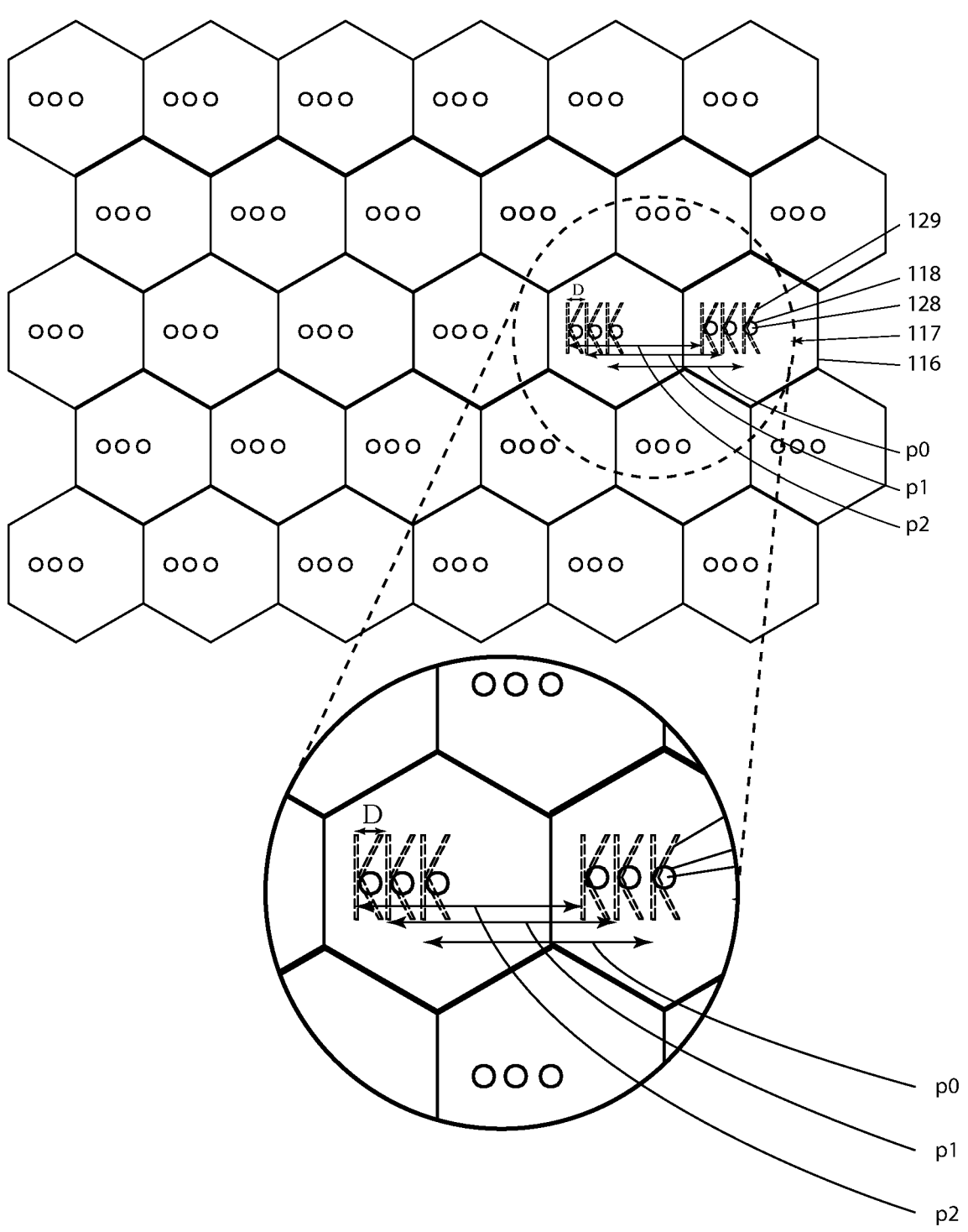
FIG. 12 illustrates schematically another embodiment of a digital image model for an animated synthetic. Specifically, the figure shows different spacing/periods between repeated digital icon images of for each viewing angle, and with similar digital icon images for each viewing direction.

FIG. 12 illustrates schematically another embodiment of a digital image model 101 for a depth-animated synthetic image. The same size of digital image object gives different perceived depth due to the period used for spacing between repeated digital icon images being different for each viewing angle. Specifically, the figure shows different periods between repeated digital icon images 129 for different viewing angles. For simplicity, the digital icon images 129 are similar for each viewing direction. The period of the lens array $P_l$, is of course the same for each digital image cell portion 118, but the periodicity $p_0$, $p_1$ and $p_2$ between neighbouring digital icon images 129 is different, resulting in different apparent depths, c.f. equation (2).

The enlarged digital image cells 116 are situated at a distance from a registration point of the digital image model, which is seen in that the position of the associated digital icon images 129 differ considerably between the digital image cell portions 118. As mentioned further above, such a displacement distance, denoted by D in the figure, is proportional to the distance from the registration point. For apparent depths considerably larger than the radius of the lenses in the lens array, the displacement distance D is further approximately proportional to the difference between the respective inverse of the apparent depths for the digital image cell portions 118.

Mathematically, the displacement distance D can be expressed as:

$$D = \frac{B(d - R_l)(d_1 - d_0)}{(d_0 - R_l)(d_1 - R_l)} \approx B(d - R_l)\left(\frac{1}{d_0} - \frac{1}{d_1}\right), \quad (4)$$

where B is the distance to the registration point and $d_0$ and $d_1$ are the depths for the synthetic images of the respective digital image cell portions 118.

The registration point 130 is a point in a digital cell at the digital image layer, in which the digital sub-images 128 of the different digital image cell portions 118 are in registry with each other. In other words, in the cell in which the registration point 130 is situated, there is no relative displacement between the digital sub-images 128 of the different digital image cell portions 118.

When having synthetic images with animation, the perceived quality of the animation is generally better when the image object of each image cell comprises a continuous feature. Having image objects comprising several smaller features presenting portions without features between the different parts associated with different digital image cell portions will typically result in a poorer impression of the animation. This is due to sudden frequent jumps in the perception of the different image details when changing viewing direction, when the imaged portion of the image objects shifts between areas where structures are present and areas where structures are not present. In animations with depth differences, the displacement distance may contribute to formation of such separated features in the image cells. For instance, as long as the image objects look like the one illustrated in FIG. 10J, clear synthetic images are expected to be seen. However, when the distant image objects of FIG. 10K, i.e. the ones situated at a large distance from the registration point, is used for producing a synthetic image, the quality is expected to be worse.

It can be noted that a fusion according to the step S27 may improve the behaviour of the perceived image, since it reduces the occurrence of "sharp" features in the image objects and provides generally smoother transitions between different parts of the image object.

This means in general that depth animations having a large maximum difference in depth can be produced with a pleasant perception in a smaller area compared to depth animations having smaller differences in depth. There is thus a trade-off between the available depth interval and the physical size of the synthetic image device.

Also the range of depths used in the animation is of importance. Shallow depths involve larger changes in the pattern periodicity for a given depth change, which in turns increases the displacement distances. This means that depth changes at a relatively large depth or height are easier to animate than depth changes close to zero. Since apparent depth and magnification is linked by the equation (3), this means that larger magnifications are easier to use for smooth depth animations than small magnifications. Preferably, magnifications of above 25, or below −25 for floating synthetic images, are to prefer, i.e. magnification magnitudes above 25.

The relative changes in magnification do also influence the perception of the animation. Preferably, the change in magnification between neighbouring images should not be larger than 20%, and most preferably not larger than 10%. Analogously, the change in depth between neighbouring images should preferably not be larger than 20%, and most preferably not larger than 10%.

For these reasons, it is very difficult to arrange for smooth depth animations going from a depth to a height or vice versa. In other words, it is preferable if the apparent depths in the animation is either all positive, i.e. all at a depth below the synthetic image device, or all negative, i.e. at a height above the synthetic image device.

However, also the size of the synthetic image object is of interest. A large intended synthetic image object, covering a large portion of an image cell, will not be equally sensitive to large displacement distances, and a pleasant synthetic image is probable to appear over a larger area.

Also, the number of animation steps may influence the useful device area. A larger number of animation steps will increase the possibility for keeping the displacement distance between two neighbouring cell regions small. Which in turn means that the useful area of the synthetic image device can be increased.

The number of animation steps comprises at least three different depths, in order to be able to produce a successive depth change instead of a sudden jump in depth. In other words, the change of depth throughout the animation utilizes at least three different depths. However, in a typical application, the number of depths is much larger. An animation using 10-20 different depths, possibly in a cyclic manner, would be a typical example.

Some rules of thumb may be given in order to give a hint of the available ranges. Preferably, the maximum displacement distance between neighbouring digital image cell portions should be kept within 5% of the image cell diameter (or other largest distance or characteristic measure within a cell), and/or within 10% of a width of the features within each digital image cell portion. The maximum useful area is inversely proportional to the pitch difference between adjacent steps.

It is also preferred to position the registration point centrally on the synthetic image device, preferably within 20% from a geometrical middle point. In such a case, the displacement distance is directed in different directions depending on at which side of the registration point the image cells are placed. Consequently, the distance to the registration point is minimized or at least significantly reduced compared to other arrangements, and thereby also the displacement distance. A registration point placed at one corner of a synthetic image device will decrease the "useful area" to one quarter compared to having the registration point in the middle.

Another measure to increase the experienced smoothness of the depth animation is to use a periodic depth change. In a periodic depth change, the apparent depth of the features provided at one border of an image cell is essentially the same as the apparent depth of the features provided at an opposite border of the image cell. In other words, within the cell, the depth is first changed and then changed back to the original value (or very close to that).

Figures 1, 13A:
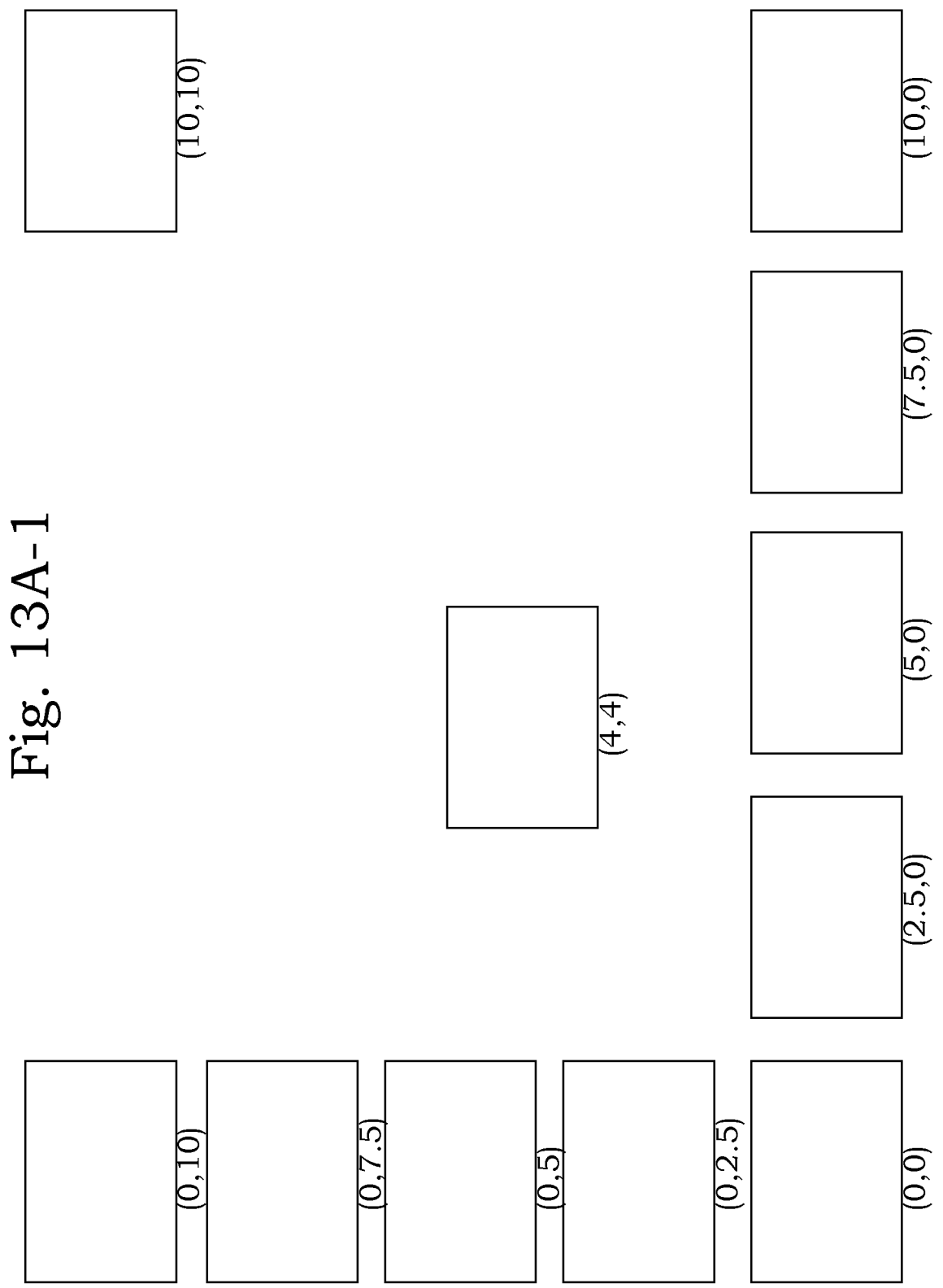
FIG. 13A illustrates screen shots of an image layer for one embodiment of a depth animation of the number "5".
Figures 3, 13A:
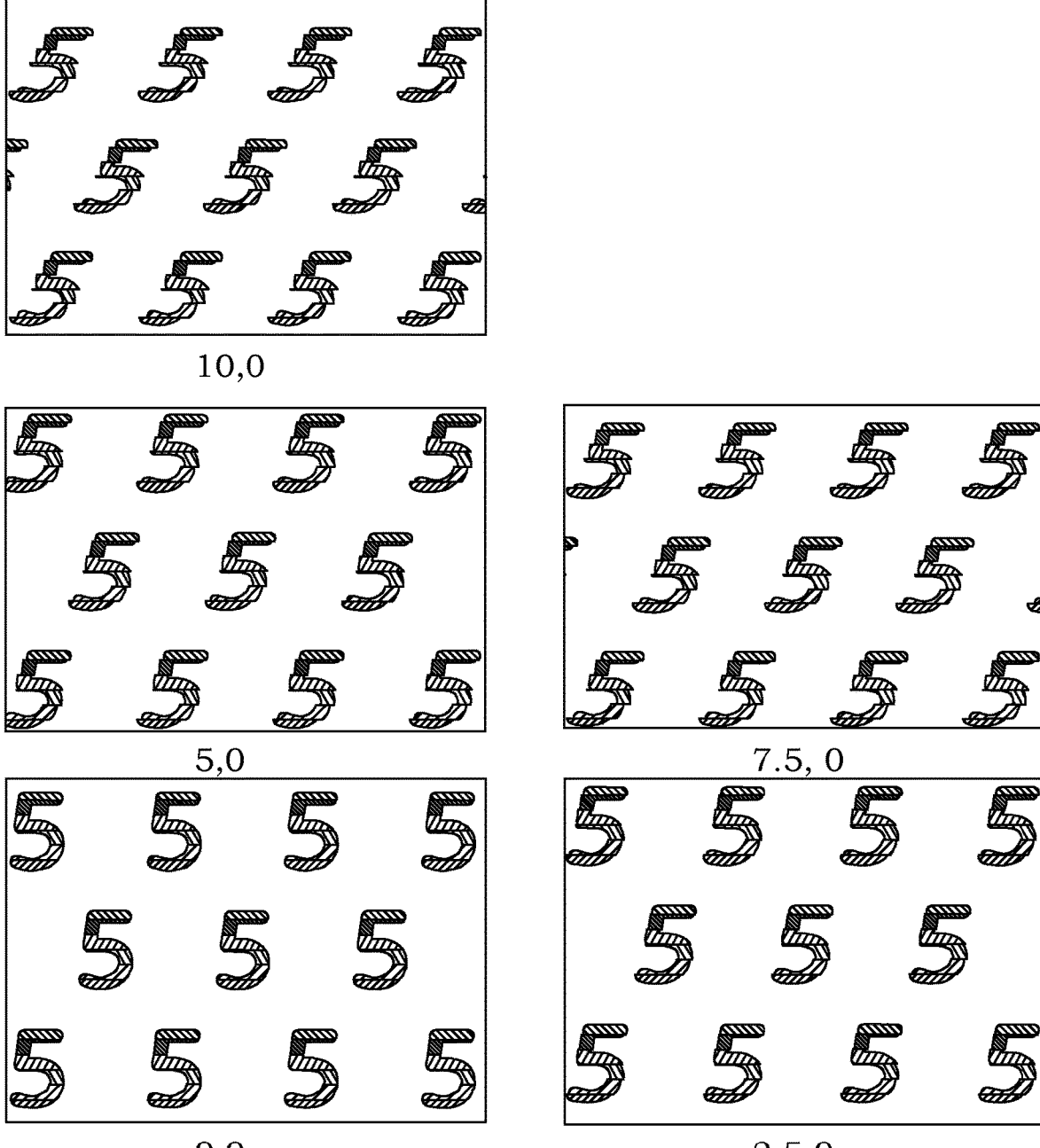
Figures 1, 13B:
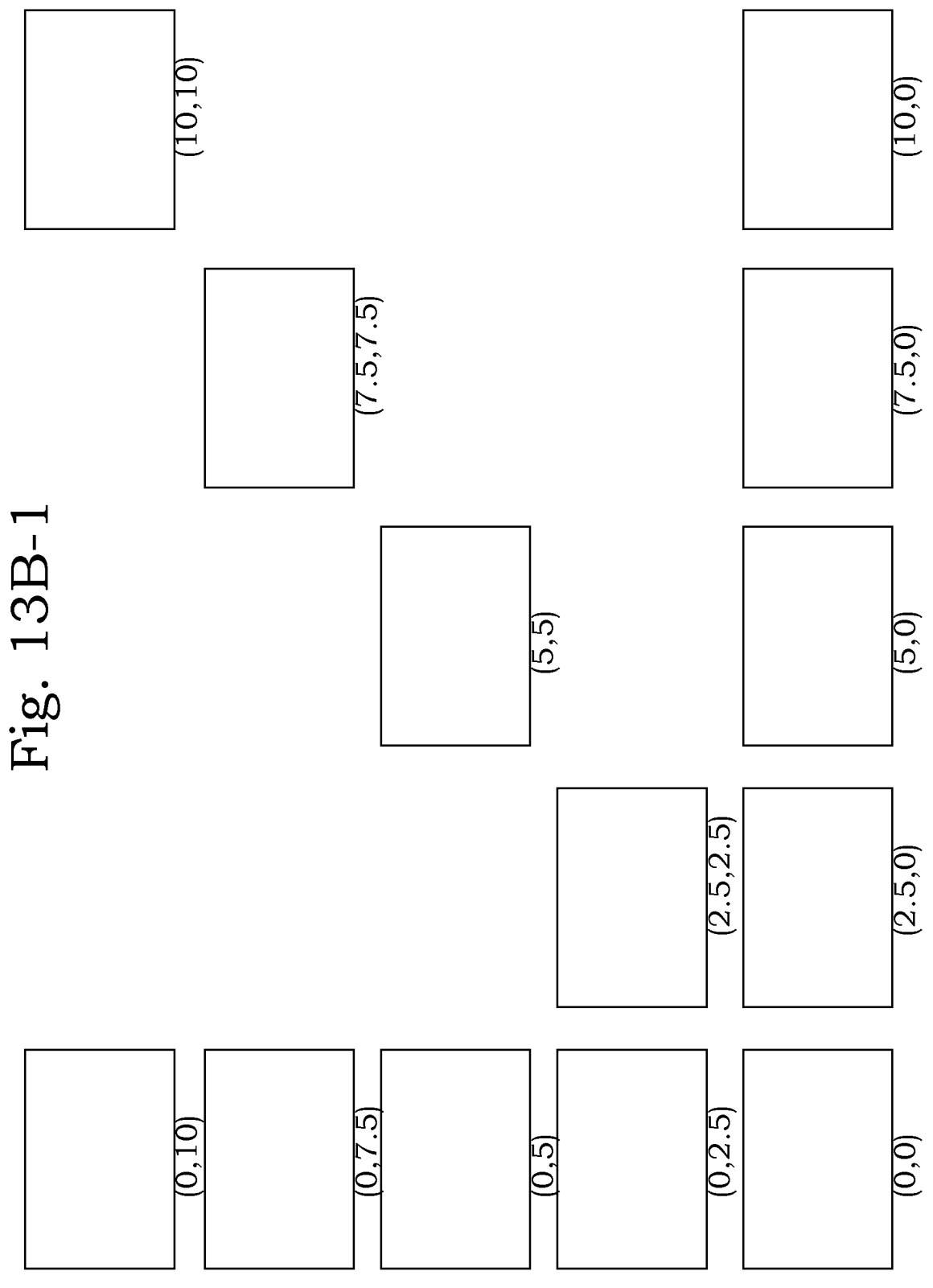
FIG. 13B illustrates screen shots of an image layer for another embodiment of a depth animation of the number "5".
Figures 3, 13B:
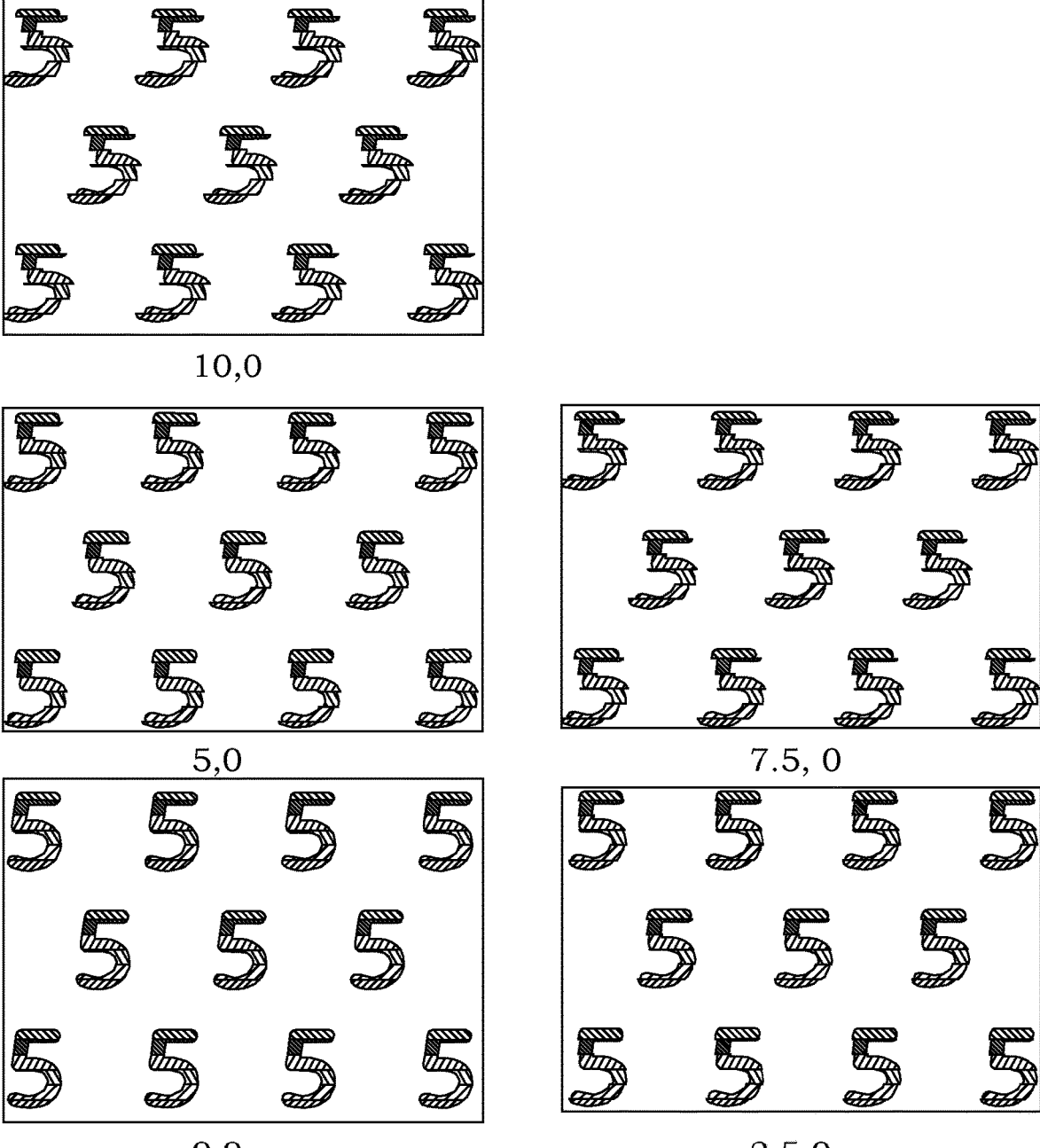

FIGS. 13A-1, 13A-2, 13A-3, 13B-1, 13B-2 and 13B-3 illustrate parts of a digital image model for two different depth animations of the figure "5". In FIGS. 13A-1 to 13A-3, the apparent depth changes from 5 to 6.75 mm (below the plane of the synthetic image device) over the digital image cell. In FIGS. 13A-2 and 13A-3, there are shown screenshots at different coordinates (in mm), as defined in FIG. 13A-1. The registration point is placed in the lower left corner of the FIG. 13A-1. Already a few mm from the registration point, the image objects, denoted 150, start to look strange and deteriorated depth animations at these positions are to be expected. In FIGS. 13B-1 to 13B-3, the apparent depth changes from 5 to 6 mm and then back to 5 mm again with 0.25 mm incremental steps, to cause a periodic depth change. In FIGS. 13B-2 and 13B-3, there are shown screenshots at different coordinates (in mm), as defined in FIG. 13B-1. The registration point is also here placed in the lower left corner of FIG. 13B-1. In this case, the image objects seem to be acceptable at least all the way out in the illustrated area.

As indicated above, one minor disadvantage of using a general integral image approach is that there may be a discontinuity when the viewing angle becomes large enough to pass a border of the image cell. This is relevant also for an animation. When the view angle reaches an image cell border and moves into a neighbouring image cell, discontinuities in the animation can be the result.

However, this may be mitigated if the animation is of a kind that can be repetitive. In such a case, the start image and the end image are the same. By selecting the associated viewing angles so that the start angle is associated with a position in the image cell that is placed in the absolute vicinity of an image cell border and that the end angle is associated with a position in the image cell that is placed in the absolute vicinity of an opposite image cell border, a continuing animation over the image cell border can be obtained.

If the animation is short, it is of course possible to have a number of cycles of such an animation within a single image cell.

In other words, in one embodiment, the creation of an image object in each image cell comprises creation of icon images repetitive in at least a first direction. A distance between neighbouring focusing elements in the first distance is equal to an integer times a repetition distance in the first direction of the continuous image objects.

Figures 14A, 14B, 14C, 14D:
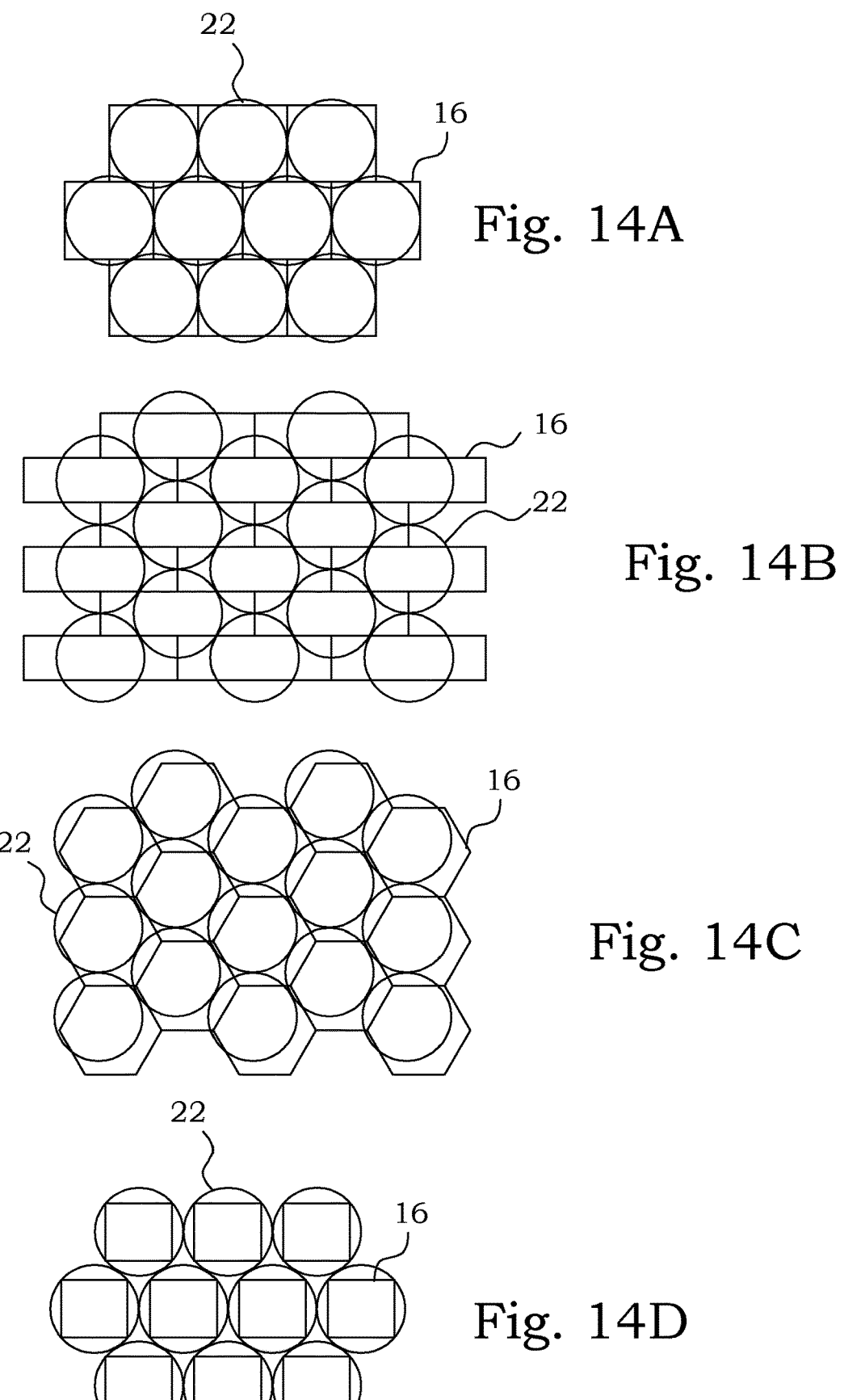
FIGS. 14A-D illustrate different embodiments of image cells.

In the above examples, the digital image cells are illustrated as rectangles. However, other geometries are also possible to use. FIG. 14A illustrates the rectangular case, where the image cells 16 cover the entire surface of the image layer. The focusing elements 22 are here assumed to have a circular shape and are also close-packed. The array of image cells 16 thereby has a same symmetry and element distance as the array of focusing elements 22, even if the shapes of the elements in the different arrays differ.

FIG. 14B illustrates another embodiment, where the image cells 16 are in the shape of rectangles. Still, the arrays, as such, have a common symmetry and element distance. This means that corresponding points within the different image cells have a same relation to a respective focusing element 22.

FIG. 14C is still another embodiment. Here, the image cells 16 have a hexagonal shape and are not fully centred compared to the focusing elements 22. However, the property that corresponding points within the different image cells have a same relation to a respective focusing element 22 is still valid.

FIG. 14D illustrates an embodiment where the image cells 16 are smaller than a maximum size. This means that in certain viewing angles, the synthetic image animation as provided by the image objects within the image cells 16 disappears. The area not covered by the image cells 16 may also be utilized for providing other synthetic images or synthetic image animations. In other words, there might be additional arrays of image cells used for creating other synthetic images provided side by side at the image layer together with the image cells 16 giving the above-discussed synthetic image animation.

Figure 15A:
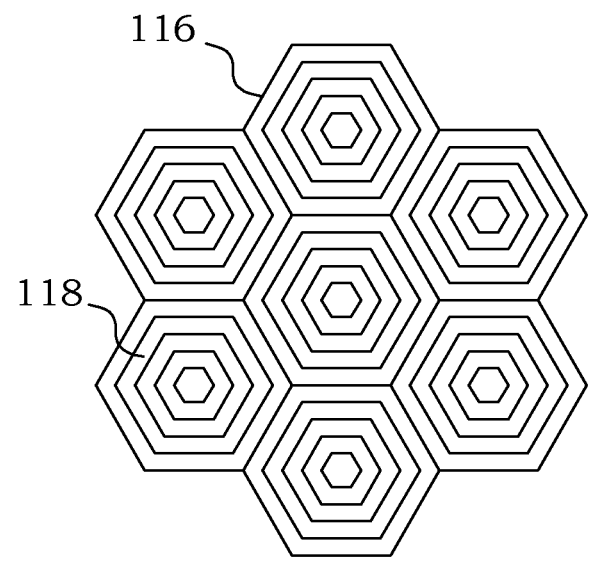
FIGS. 15A-C illustrate different embodiments of digital image cell portions.
Figure 15B:
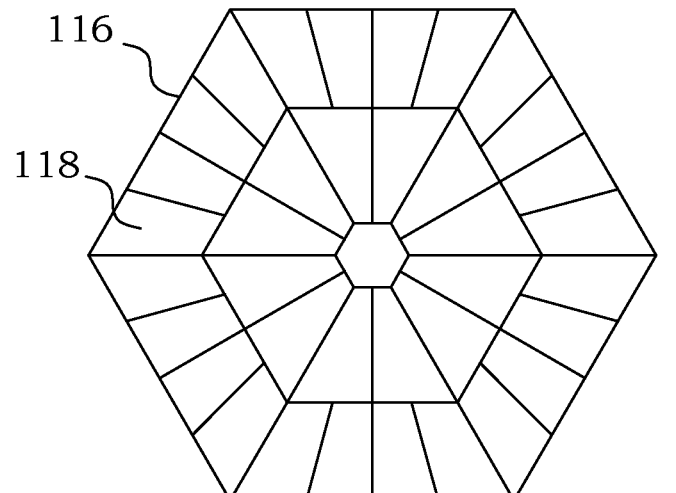
Figure 15C:
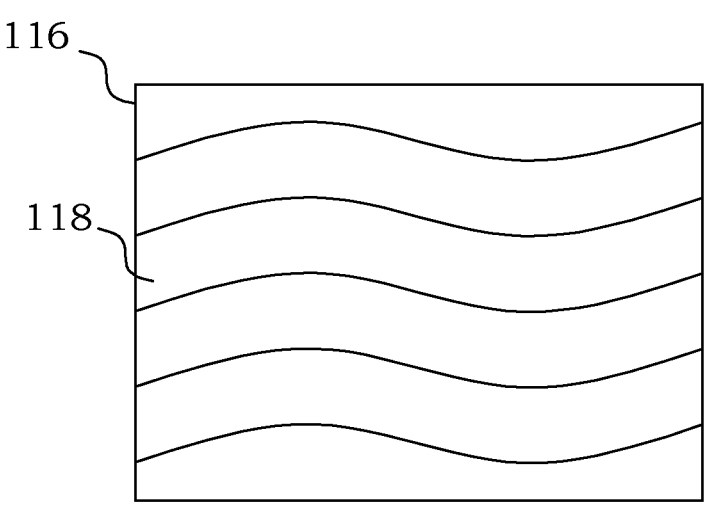

In the examples above, the digital image cell portions have been stripes with a rectangular shape. However, this is not a necessity, and a large variety of shapes and sizes of the digital image cell portions can be utilized. FIG. 15A illustrates 7 digital image cells 116 with a hexagonal symmetry, which are divided into digital image cell portions 118 being hexagonally shaped closed stripes. FIG. 15B illustrates a digital image cell 116 that is divided in digital image cell portions 118 of varying size and shapes. The division of one digital image cell 116 into digital image cell portions 118 in a digital image model may also differ from the division of another digital image cell 116 into digital image cell portions 118 in the same digital image layer model. This opens up for treating the adaptations of the different digital image cells 116 in different ways, e.g. depending on the complexity of the structures in that specific cell. The digital image cell portions 118 do not necessarily have straight edges, as e.g. illustrated in FIG. 15C.

Above, the description has been made under the assumption that the digital image cell portions are situated side-by-side in contact with each other. It is, however, also possible to use digital image cells portions that slightly overlaps. In such cases, the digital sub-images in these overlapping areas are typically adapted to provide a smooth transition between the different digital image cell portions. It is also possible to use digital image cell portions that are separated by a small gap. In such a case, there will be a small angle sector, within which no digital sub-images are associated. An alternative in such a case is to interpolate the digital sub-images between the neighbouring digital image cell portions as a filling out of the noncovered portions.

Each digital image cell, and thereby each physical image cell based thereon, is associated with a respective focusing element. If the image cell array is aligned with the array of focusing elements, the perceived depth is the same over the entire area of the synthetic image device. However, if there is a misalignment, unintentional or on purpose, between the two arrays, a specific viewing angle will select image portions from different image cell portions over the surface of the synthetic image device. The perceived image will thereby be given a differing depth for different parts. This can be understood as a simultaneous combination of a depth animation and an orthoparallactic image movement.

Another way of producing depth changes in synthetic image devices, here denoted as a "pitch effect", is to provide image objects with a varying pitch p(x,y) over the (physical) image layer. Basic principles are e.g. described in EP2542423. This approach can be used on its own, resulting in different perceived depths/heights over the image layer. The local depth/height can be expressed as a function h(x,y) directly related to the local pitch p(x,y). In contrary to the main technologies disclosed here, the device does not need to be tilted to produce these changes in depth/height, but instead, they appear at different locations over the surface. However, the two techniques can be combined.

In one embodiment of a combination, the steps of the animation consist of a series of images presenting distinct pitch effects. If the synthetic image device is turned, i.e. the selected viewing angle is changed, the local depths/heights change in accordance to the functions $(h_1(x,y), h_2(x,y), \ldots)$ of the different images. Expressed differently, the depth/height in the series of synthetic images is given by $h(x,y,\theta)$, where $\theta$ is the viewing angle.

Another surprising effect of a synthetic image here denoted as a "polar effect", is to invert the polarity of one synthetic image upon tilting the synthetic-image device, i.e. by changing the viewing direction. In that case, the contents of neighbouring image cell portions differ in that the zones 11 (FIG. 1A) with features and the zone 11B (FIG. 1A) without any particular features are inverted. This effect may easily be combined with the above described depth changes.

The number of cell portions for a pure polar effect is typically two, but can be higher, in particular when combined with depth change effects. A higher number of cell portions can for example be used to increase the "speed" of the transitions, i.e. the number of transitions per angular unit.

For the polar effect, the so-called print density associated with each synthetic image is an important parameter. The print density of a synthetic image is defined as the ratio between the zones 11 (FIG. 1A) with features and the total area covered by the image layer associated with the synthetic image.

If the print density for a synthetical image is n %, the print density for the same synthetical image with inverted polarity is therefore (100−n) %. For example, inverting the polarity of an image with a print density of 47% leads to an image with a print density of 53%.

In order to obtain a striking polar effect easy to recognize, a large change in print density is desirable. For the polar effect, the difference between the print densities is preferably at least 40% (i.e. a change from 30% to 70% or opposite), more preferably at least 60% (from 20% to 80% or opposite) and most preferably 80% (from 10% to 90% or opposite).

In some advanced examples, the polarity switch can be restricted to certain adjacent steps of a synthetic image animation including transitions in shape, position, orientation and size of the digital icon images. For example, a zoom effect can present one or more polarity changes to create a stronger visual effect. For a zoom effect, the polarity could for example be inverted for the synthetic image with the largest magnification.

A striking effect associated with a significant change in the print density between images can of course be obtained without inverting the polarity of the synthetical images. This effect is here denoted as a "color shift". In that case, the contents of neighbouring image cell portions simply produce different images with distinct print densities upon tilting the synthetic-image device. By choosing a first color for the print and possibly a second color for a background layer covering the entire image layer, a color shift can be obtained between the images as a result of the change in print density.

The number of cell portions for the color shift effect is at least two. The different images can for example be a densely packed text changing into a very light design.

Again, in order to obtain a striking effect easy to recognize, a large change in print density is desirable. For the color shift effect, the difference between the print densities is preferably at least 40% (i.e. a change from 30% to 70% or opposite), more preferably at least 60% (from 20% to 80% or opposite) and most preferably 80% (from 10% to 90% or opposite).

As for the polar effect, the color shift effect can be restricted to certain adjacent steps of a synthetic image animation including transitions in shape, position, orientation and size of the digital icon images. For example, a zoom effect can present one or more color shifts to create a stronger visual effect.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for manufacturing a synthetic image device, comprising the steps of:

providing a focusing element array; and arranging an image layer in a vicinity of a focal distance of focusing elements of said focusing element array, whereby a synthetic image composed of enlarged portions of said image layer becomes perceivable for a viewer, wherein said image layer comprises an array of image cells, wherein each image cell is associated with a respective focusing element of said focusing element array and wherein said array of image cells having a same element distance as said focusing element array, wherein said step of arranging the image layer comprises creation of a respective image object within each respective one of said image cells, said image objects being such that an animation becomes perceivable, said animation comprising a series of synthetic images perceivable in-series as the viewing direction changes from a first viewing direction to a second viewing direction, wherein the image objects are such that each one of the synthetic images of said series is perceivable at a respective depth changing between the synthetic images of said series of synthetic images, wherein said creation of a respective image object comprises, in image cell portions associated with a respective viewing direction, creation of a pattern of an icon image, said pattern being defined at least by a pattern spacing between repeating icon images enabling perception of respective synthetic image at the respective depth, wherein the change of depth throughout the animation utilizes at least three different depths, and wherein a change in magnification between neighbouring images is smaller than 20%.

2. The method according to claim 1, wherein a contents of each respective image object is determined using a respective digital image object of a digital image model, wherein each digital image object is derived by deducing for each viewing direction a respective digital sub-image for a respective digital image cell portion of the respective digital image cell, and subsequently merging the associated digital sub-images of each digital image object to form the respective digital image object, wherein each digital image cell portion corresponds to a portion of the image object visible through the respective focusing element in the respective viewing direction.

3. The method according to claim 2, wherein the sub-images for each viewing direction are deduced by:

a) creating for each synthetic image of the series of synthetic images a digital pattern of a digital icon image, said digital pattern being defined at least by a pattern spacing between repeating digital icon images, said pattern spacing being chosen to enable perception at the perceivable depth of the respective synthetic image; and b) based on the digital pattern derive the respective digital sub-images by digitally masking the digital pattern using a mask pattern corresponding to the digital image cell portions of the respective viewing direction.

4. The method according to claim 3, wherein the icon image associated with each synthetic image of said series of synthetic images remains unchanged between the synthetic images of the series of synthetic images, or wherein the icon image associated with each synthetic image of said series of synthetic images is modified for each of said synthetic images, such as by change of shape, size, color, lateral position and/or rotation.

5. The method according to claim 1, wherein the change of depth throughout the animation is a one-way change of depth starting at a first depth and ending at a second depth.

6. The method according to claim 5, wherein the first and the second depths are both perceivable as being in front of the image layer or both perceivable as being behind the image layer.

7. The method according to claim 5, wherein the first depth and the second depth together define an average depth halfway between the first depth and the second depth, and wherein the change in depth between any adjacent synthetic images of the series of synthetic images is lower than 10% of the average depth.

8. The method according to claim 1, wherein the change of depth throughout the animation is a two-way change of depth starting at a first depth, changing to a second depth, and then changing back to the first depth.

9. The method according to claim 8, wherein the first and the second depths are both perceivable as being in front of the image layer or both perceivable as being behind the image layer.

10. The method according to claim 1, wherein a magnification of said image objects has a magnitude above 25.

11. The method according to claim 1, wherein a change in magnification between neighbouring images is smaller than 10%.

12. The method according to claim 1, wherein a change in depth between neighbouring images is smaller than 20%.

13. The method according to claim 1, wherein a maximum displacement distance between corresponding image object points of neighbouring digital image cell portions should be kept within 5% of an image cell diameter.

14. The method according to claim 1, wherein a maximum displacement distance between corresponding image object points of neighbouring digital image cell portions should be kept within 10% of a width of features within each digital image cell portion.

15. The method according to claim 1, further comprising the step of aligning the icon image patterns corresponding to each of the at least three different depths at a common registration point, wherein said common registration point is positioned within 20% from a geometrical middle point of said synthetic image device, such that in a digital image cell in which the registration point is situated, there is no relative displacement between the digital sub-images of the different digital image cell portions for the at least three different depths.

16. The method according to claim 1, wherein said creation of image objects in each image cell comprises embossing said image objects in a polymer layer on a polymer substrate presenting said focusing elements, or printing said image objects on the polymer substrate presenting said focusing elements.

17. The method according to claim 16, wherein said creation of image objects in each said image cell comprises forming a tool for said embossing or printing with recesses formed according to said image objects to be created.

18. The method according to claim 17, wherein said printing comprises controlling of a printer head to print said image objects to be created.

19. The method according to claim 16, wherein said printing comprises controlling of a printer head to print said image objects to be created.

20. A synthetic image device, comprising:

a focusing element array; and an image layer;

wherein said image layer is arranged in a vicinity of a focal distanced of focusing elements of said focusing element array, whereby a synthetic image composed of enlarged portions of said image layer becomes perceivable for a viewer, wherein said image layer comprises an array of image cells, wherein each image cell is associated with a respective focusing element of said focusing element array and wherein said array of image cells having a same element distance as said focusing element array, wherein each image cell comprises an image object, wherein said image objects are such that an animation becomes perceivable, said animation comprising a series of synthetic images perceivable in-series as the viewing direction changes from a first viewing direction to a second viewing direction, wherein the image objects are such that each one of the synthetic images of said series is perceivable at a respective depth changing between the synthetic images of said series of synthetic images, wherein said image objects comprise, in image cell portions associated with a respective viewing direction, a 5 pattern of an icon image, said pattern being defined at least by a pattern spacing between repeating icon images enabling perception of respective synthetic image at the respective depth, wherein the change of depth throughout the animation 10 utilizes at least three different depths, and wherein a change in magnification between neighbouring images is smaller than 20%.

\* \* \* \* \*